United States Patent
Nakatomi et al.

(10) Patent No.: US 10,130,928 B2
(45) Date of Patent: Nov. 20, 2018

(54) PROCESS FOR PRODUCING HEAT-EXPANDABLE MICROSPHERES AND APPLICATION THEREOF

(71) Applicant: MATSUMOTO YUSHI-SEIYAKU CO., LTD., Yao-shi, Osaka (JP)

(72) Inventors: Daisuke Nakatomi, Yao (JP); Kazunari Ueda, Yao (JP); Katsushi Miki, Yao (JP)

(73) Assignee: MATSUMOTO YUSHI-SEIYAKU CO., LTD., Osaka (JP)

( * ) Notice: Subject to any disclaimer, the term of this patent is extended or adjusted under 35 U.S.C. 154(b) by 32 days.

(21) Appl. No.: 15/104,628

(22) PCT Filed: Dec. 15, 2014

(86) PCT No.: PCT/JP2014/083075
§ 371 (c)(1),
(2) Date: Jun. 15, 2016

(87) PCT Pub. No.: WO2015/098586
PCT Pub. Date: Jul. 2, 2015

(65) Prior Publication Data
US 2016/0310924 A1 Oct. 27, 2016

(30) Foreign Application Priority Data
Dec. 26, 2013 (JP) ................. 2013-268170

(51) Int. Cl.
*C08J 9/14* (2006.01)
*B32B 27/00* (2006.01)
(Continued)

(52) U.S. Cl.
CPC ............. *B01J 13/18* (2013.01); *B01J 13/14* (2013.01); *B32B 13/00* (2013.01);
(Continued)

(58) Field of Classification Search
CPC ...... C08J 9/14; C08J 9/20; B01J 13/18; B32B 27/20
See application file for complete search history.

(56) References Cited

U.S. PATENT DOCUMENTS 3,615,972 A 10/1971 Morehouse, Jr. et al.
4,513,106 A * 4/1985 Edgren .................. B01J 19/20
264/53
(Continued)

FOREIGN PATENT DOCUMENTS

JP 42-26524 B1 12/1967
JP 2003-220329 A 8/2003
(Continued)

OTHER PUBLICATIONS

LUDOX Colloidal Silica (Grace Materials Technologies) Product Sheet (8 pages, 2012) (Year: 2012).*
(Continued)

*Primary Examiner* — Mark Kopec
(74) *Attorney, Agent, or Firm* — Sughrue Mion, PLLC

(57) ABSTRACT

A process for producing heat-expandable microspheres including a thermoplastic resin shell and a blowing agent encapsulated therein. The process includes the steps of dispersing a polymerizable component and the blowing agent in an aqueous dispersion medium having a pH of 7 or less and containing a fine-particle metal compound having a mean particle size ranging from 1.0 to 10 nm, and polymerizing the polymerizable component. The amount of the fine-particle metal compound ranges from 0.15 to 20 parts by weight to 100 parts by weight of the total amount of the polymerizable component and the blowing agent. Also disclosed are heat-expandable microspheres produced by dispersing a polymerizable component and a blowing agent in an aqueous dispersion medium containing colloidal silica and polymerizing the polymerizable component. Also dis-
(Continued)

closed is a composition containing the heat-expandable microspheres and a base component, a formed product, a slurry composition for use in forming a negative electrode of a lithium-ion secondary battery and a negative electrode.

4 Claims, 1 Drawing Sheet

(51) Int. Cl.

| | | |
|---|---|---|
| *B01J 13/18* | (2006.01) | |
| *B32B 13/00* | (2006.01) | |
| *B01J 13/14* | (2006.01) | |
| *H01M 4/04* | (2006.01) | |
| *H01M 4/133* | (2010.01) | |
| *H01M 4/134* | (2010.01) | |
| *H01M 4/38* | (2006.01) | |
| *H01M 4/583* | (2010.01) | |
| *H01M 4/62* | (2006.01) | |
| *H01M 4/66* | (2006.01) | |
| *H01M 10/0525* | (2010.01) | |
| *H01M 4/1393* | (2010.01) | |
| *H01M 4/587* | (2010.01) | |
| *H01M 4/02* | (2006.01) | |
| *H01M 10/052* | (2010.01) | |

(52) U.S. Cl.
CPC ....... *H01M 4/0404* (2013.01); *H01M 4/0409* (2013.01); *H01M 4/0411* (2013.01); *H01M 4/133* (2013.01); *H01M 4/134* (2013.01); *H01M 4/1393* (2013.01); *H01M 4/38* (2013.01); *H01M 4/386* (2013.01); *H01M 4/387* (2013.01); *H01M 4/583* (2013.01); *H01M 4/587* (2013.01); *H01M 4/622* (2013.01); *H01M 4/661* (2013.01); *H01M 4/663* (2013.01); *H01M 10/0525* (2013.01); *H01M 10/052* (2013.01); *H01M 2004/027* (2013.01)

(56) References Cited

U.S. PATENT DOCUMENTS

| | | | |
|---|---|---|---|
| 4,722,943 A * | 2/1988 | Melber | B01J 13/206 |
| | | | 428/407 |
| 6,365,641 B1 | 4/2002 | Masuda et al. | |
| 8,754,141 B2 * | 6/2014 | Masuda | B01J 13/14 |
| | | | 428/402 |
| 2010/0204349 A1 * | 8/2010 | Inohara | B01J 13/14 |
| | | | 521/56 |
| 2011/0263746 A1 | 10/2011 | Kawaguchi et al. | |
| 2014/0154583 A1 | 6/2014 | Ueki et al. | |

FOREIGN PATENT DOCUMENTS

| | | |
|---|---|---|
| JP | 2010-132860 A | 6/2010 |
| JP | 2012-052001 A | 3/2012 |
| JP | 2013-076032 A | 4/2013 |
| JP | 2013-213077 A | 10/2013 |
| WO | 2001/23081 A1 | 4/2001 |
| WO | 2013/014742 A1 | 1/2013 |
| WO | 2013/047016 A1 | 4/2013 |
| WO | 2013/123517 A1 | 8/2013 |

OTHER PUBLICATIONS

Bergna et al (editor) "Colloidal Silica Fundamentals and Applications", vol. 131, Taylor & Francis Group, pp. 556-558 (2005) (Year: 2005).*

International Search Report for PCT/JP2014/083075 dated Mar. 17, 2015.

Communication dated Nov. 14, 2017, from the Swedish Patent and Registration Office in counterpart application No. 1651073-7.

* cited by examiner

PROCESS FOR PRODUCING HEAT-EXPANDABLE MICROSPHERES AND APPLICATION THEREOF

CROSS-REFERENCE TO RELATED APPLICATIONS

This application is a National Stage of International Application No. PCT/JP2014/083075 filed Dec. 15, 2014, claiming priority based on Japanese Patent Application No. 2013-268170 filed Dec. 26, 2013, the contents of all of which are incorporated herein by reference in their entirety.

1. Field of the Invention

The present invention relates to a process for producing heat-expandable microspheres and application of the same.

2. Description of the Related Art

Heat-expandable microspheres have a structure essentially comprising a thermoplastic resin shell and a blowing agent (core) encapsulated therein. A method of forming such heat-expandable microspheres has been disclosed (refer to PTL 1). The method includes the steps of mixing an oil-soluble polymerization initiator with an oily mixture prepared by blending a polymerizable monomer with a volatile blowing agent such as low-boiling-point aliphatic hydrocarbon, and adding the oily mixture to an aqueous dispersion medium with agitation to subject the mixture to suspension polymerization so as to form heat-expandable microspheres which encapsulate a volatile blowing agent.

Of those heat-expandable microspheres, small microspheres having a mean particle size of 10 μm or less can be produced in a process, for example, of employing a reactive surfactant having a double bond in a molecule (refer to PTL 2).

The heat-expandable microspheres produced in the process mentioned above are apt to agglomerate during thermal expansion and exhibit poor dispersibility due to their thermoplastic resin shell plasticized by the reactive surfactants entering into the thermoplastic resin. The process for producing such heat-expandable microspheres with the plasticized shell requires a large amount of colloidal silica as a dispersion stabilizer which controls the agglomeration of the microspheres during suspension polymerization. Although the process can produce minute heat-expandable microspheres having a mean particle size of 10 μm or less, the heat-expandable microspheres contain more than 10 wt % of ash which cannot be decreased by washing, and this can cause problems, such as increased viscosity of paints containing the microspheres.

[PTL 1] Japanese Examined Patent Publication No. 42-26524

[PTL 2] Japanese Patent Application Publication No. 2003-220329

SUMMARY OF THE INVENTION

It is therefore an object of the present invention to provide a process for efficiently producing heat-expandable microspheres having a small particle size, containing minimum ash and which are expandable into hollow particles having good dispersibility, and applications thereof.

Upon diligent study, the present inventors found that the above object is achieved by polymerizing a polymerizable component in an aqueous dispersion medium containing a specific ratio of a fine-particle metal compound of a specific particle size so as to achieve the present invention.

That is, in a first aspect, the present invention provides a process for producing heat-expandable microspheres comprising a thermoplastic resin shell and a blowing agent encapsulated therein. The process comprises the steps of dispersing a polymerizable component and the blowing agent in an aqueous dispersion medium having a pH of 7 or less and containing a fine-particle metal compound having a mean particle size ranging from 1.0 to 10 nm and polymerizing the polymerizable component, wherein an amount of the fine-particle metal compound ranges from 0.15 to 20 parts by weight to 100 parts by weight of the total amount of the polymerizable component and the blowing agent.

The process of the present invention preferably satisfies at least one of the following requirements from (1) to (6).

(1) The fine-particle metal compound is colloidal silica.

(2) The heat-expandable microspheres contain 5 wt % or less of silicon.

(3) The aqueous dispersion medium has a pH ranging from 1.5 to 5.

(4) The fine-particle metal compound has a specific surface area ranging from 270 to 2720 $m^2/g$.

(5) The heat-expandable microspheres have a mean particle size ranging from 0.01 to 10 μm.

(6) The heat-expandable microspheres contain 10 wt % or less of ash.

The heat-expandable microspheres of the present invention comprise a thermoplastic resin shell and a blowing agent encapsulated therein, and are produced by dispersing a polymerizable component and the blowing agent in an aqueous dispersion medium containing colloidal silica and polymerizing the polymerizable component. The heat-expandable microspheres have a mean particle size ranging from 0.01 to 10 μm and contain 5 wt % or less of silicon.

The hollow particles of the present invention are produced by thermally expanding the heat-expandable microspheres produced in the process for producing heat-expandable microspheres mentioned above and/or the heat-expandable microspheres mentioned above. The hollow particles preferably contain fine particles coating an outer surface of the hollow particles.

A composition of the present invention contains at least one particulate material selected from the group consisting of the heat-expandable microspheres produced in the process for producing heat-expandable microspheres mentioned above, the heat-expandable microspheres mentioned above and the hollow particles mentioned above, and a base component.

A formed product of the present invention is produced by forming the composition mentioned above.

The slurry composition for a negative electrode of a lithium-ion secondary battery of the present invention contains at least one particulate material selected from the group consisting of the heat-expandable microspheres produced in the process for producing heat-expandable microspheres mentioned above, the heat-expandable microspheres mentioned above and the hollow particles mentioned above; a negative electrode binder; and a negative electrode active material.

A negative electrode of a lithium-ion secondary battery of the present invention is manufactured by applying the aforementioned slurry composition for the negative electrode of a lithium-ion secondary battery to a current collector.

Advantageous Effects of Invention

The process for producing the heat-expandable microspheres of the present invention efficiently produces heat-expandable microspheres having a small particle size, containing minimum ash and which thermally expand into hollow particles having good dispersibility.

The hollow particles of the present invention produced from the heat-expandable microspheres mentioned above are lightweight, have a small particle size, contain minimum ash, and have good dispersibility.

The composition of the present invention containing the heat-expandable microspheres and/or hollow particles produced in the method mentioned above is lightweight and has good physical properties.

The formed product of the present invention obtained by forming the composition mentioned above is lightweight and has good physical properties.

REFERENCE NUMERALS LIST

Figure 1:
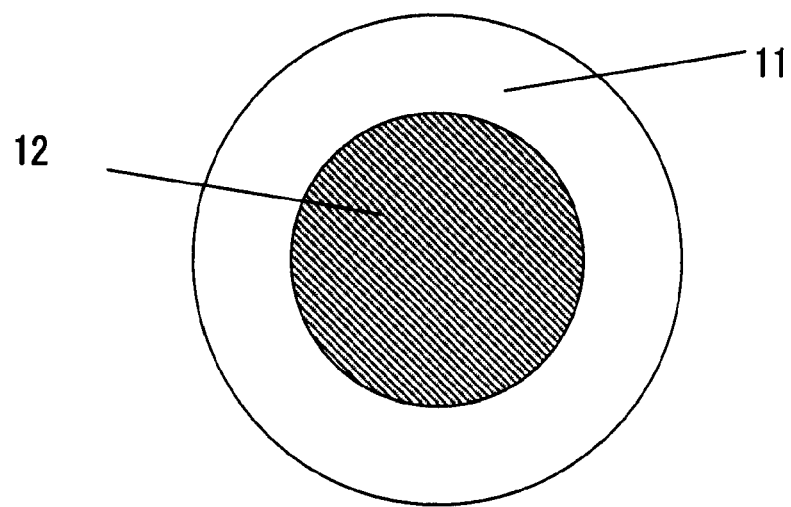
FIG. 1 is a schematic diagram of an example of the heat-expandable microspheres

Reference numerals used to identify various features in the drawings include the following:
11 Shell of thermoplastic resin
12 Blowing agent
1 Hollow particles (fine-particle-coated hollow particles)
2 Shell
3 Hollow
4 Fine particle (in a state of adhesion)
5 Fine particle (in a state of fixation in a dent)

DETAILED DESCRIPTION OF THE PREFERRED EMBODIMENTS

The invention will now be described in greater detail with reference to the drawings. However, the present invention should not be construed as being limited thereto.

Process for Producing Heat-expandable Microspheres

The process of the present invention produces heat-expandable microspheres essentially comprising a thermoplastic resin shell and a blowing agent encapsulated therein. The process comprises the steps of dispersing a polymerizable component and the blowing agent in an aqueous dispersion medium of pH 7 or less containing a fine-particle metal compound having a mean particle size ranging from 1.0 to 10 nm, and polymerizing the polymerizable component, wherein the amount of the fine-particle metal compound ranges from 0.15 to 20 parts by weight to 100 parts by weight of the total amount of the polymerizable component and the blowing agent.

Polymerization Step

The blowing agent is not specifically restricted except that it should be a thermally vaporizable substance, and includes, for example, $C_3$-$C_{13}$ hydrocarbons such as propane, (iso)butane, (iso)pentane, (iso)hexane, (iso)heptane, (iso)octane, (iso)nonane, (iso)decane, (iso)undecane, (iso)dodecane and (iso)tridecane; hydrocarbons having a carbon number greater than 13 and not greater than 20, such as (iso)hexadecane and (iso)eicosane; hydrocarbons from petroleum fractions such as pseudocumene, petroleum ether, and normal paraffins and isoparaffins having an initial boiling point ranging from 150 to 260° C. and/or being distilled at a temperature ranging from 70 to 360° C.; halides of $C_1$-$C_{12}$ hydrocarbons, such as methyl chloride, methylene chloride, chloroform and carbon tetrachloride; fluorine-containing compounds, such as hydrofluoroether; silanes having $C_1$-$C_5$ alkyl groups, such as tetramethyl silane, trimethylethyl silane, trimethylisopropyl silane and trimethyl-n-propyl silane; and compounds which thermally decompose to generate gases, such as azodicarbonamide, N,N'-dinitrosopentamethylenetetramine and 4,4'-oxybis(benzenesulfonyl hydrazide). One of or a combination of at least two of those blowing agents can be employed. The aforementioned blowing agents can be any of linear, branched or alicyclic compounds, and should preferably be aliphatic compounds.

The blowing agent is thermally vaporizable and should preferably have a boiling point not higher than the softening point of the thermoplastic resin shell, because such blowing agent encapsulated in heat-expandable microspheres can generate sufficient vapor pressure at the expansion temperature of the heat-expandable microspheres to attain high expansion ratio. In addition, another blowing agent having a boiling point higher than the softening point of the thermoplastic resin shell can be encapsulated along with the blowing agent having a boiling point not higher than the softening point of the thermoplastic resin shell.

The polymerizable component is polymerized in the presence of a polymerization initiator to be converted into a thermoplastic resin which forms the shell of the heat-expandable microspheres. The polymerizable component essentially contains a monomer component and can optionally contain a cross-linking agent.

The monomer component is not specifically restricted, and generally includes a component called a radically-polymerizable monomer having a polymerizable double bond.

The polymerizable component is not specifically restricted, and includes, for example, nitrile monomers such as acrylonitrile, methacrylonitrile, and fumaronitrile; carboxyl-group-containing monomers such as acrylic acid, methacrylic acid, ethacrylic acid, crotonic acid, cinnamic acid, maleic acid, itaconic acid, fumaric acid, citraconic acid, and chloromaleic acid; vinyl halide monomers, such as vinyl chloride; vinylidene halide monomers, such as vinylidene chloride; vinyl ester monomers, such as vinyl acetate, vinyl propionate and vinyl butyrate; (meth)acrylate monomers, such as methyl (meth)acrylate, ethyl (meth)acrylate, n-butyl (meth)acrylate, t-butyl (meth)acrylate, 2-ethylhexyl (meth)acrylate, stearyl (meth)acrylate, phenyl (meth)acrylate, isobornyl (meth)acrylate, cyclohexyl (meth)acrylate, benzyl (meth)acrylate, and 2-hydroxyethyl (meth)acrylate; (meth)acrylamide monomers, such as acrylamide, substituted acrylamide, methacrylamide and substituted methacrylamide; maleimide monomers, such as N-phenyl maleimide and N-cyclohexyl maleimide; styrene monomers, such as styrene and α-methyl styrene; ethylenically unsaturated monoolefin monomers, such as ethylene, propylene, and isobutylene; vinyl ether monomers, such as vinyl methyl ether, vinyl ethyl ether and vinyl isobutyl ether; vinyl ketone monomers, such as vinyl methyl ketone; N-vinyl monomers, such as N-vinyl carbazole and N-vinyl pyrolidone; and vinyl naphthalene salts. The monomer component can contain one of or a combination of at least two of those radically polymerizable monomers. The term, "(meth)acryl", means acryl or methacryl.

The polymerizable component should preferably contain at least one monomer component selected from the group consisting of nitrile monomers, carboxyl-group-containing monomers, (meth)acrylate monomers, styrene monomers, vinyl ester monomers, acrylamide monomers, and vinylidene halide monomers.

A polymerizable component essentially containing a nitrile monomer is preferable for producing heat-expandable microspheres of high solvent resistance. Preferable nitrile monomers are acrylonitrile and methacrylonitrile for their availability and high heat and solvent resistance.

In a nitrile monomer containing acrylonitrile (AN) and methacrylonitrile (MAN), the weight ratio of acrylonitrile to methacrylonitrile (AN:MAN) is not specifically restricted, and should preferably range from 10:90 to 90:10, more preferably from 20:80 to 80:20, and further more preferably from 30:70 to 80:20. A weight ratio of AN to MAN less than 10:90 can cause poor gas impermeability of the resultant microspheres. On the other hand, a weight ratio of AN to MAN greater than 90:10 can result in insufficient expansion ratio of the microspheres.

The weight ratio of the nitrile monomers is not specifically restricted, and should preferably range from 20 to 100 wt % of the monomer component, more preferably from 30 to 100 wt %, further more preferably from 40 to 100 wt %, yet further more preferably from 50 to 100 wt %, and most preferably from 60 to 100 wt %. A monomer component containing less than 20 wt % of nitrile monomers can deteriorate solvent resistance of resultant microspheres.

A polymerizable component essentially containing a carboxyl-group-containing monomer will contribute to excellent heat and solvent resistance of resultant heat-expandable microspheres. Acrylic acid and methacrylic acid are preferable carboxyl-group-containing monomers owing to their availability and improved heat resistance of resultant heat-expandable microspheres.

The weight ratio of the carboxyl-group-containing monomers is not specifically restricted, and should preferably range from 10 to 70 wt % of the monomer component, more preferably from 15 to 60 wt %, further more preferably from 20 to 50 wt %, yet further more preferably from 25 to 45 wt %, and most preferably from 30 to 40 wt %. A weight ratio of the carboxyl-group-containing monomers less than 10 wt % can cause insufficient heat resistance of resultant heat-expandable microspheres. On the other hand, a weight ratio of the carboxyl-group-containing monomers greater than 70 wt % can cause poor gas impermeability of the resultant microspheres.

For the monomer component essentially containing a nitrile monomer and carboxyl-group-containing monomer, the total weight ratio of the nitrile monomer and carboxyl-group-containing monomer should preferably be at least 50 wt % of the monomer component, more preferably at least 60 wt %, further more preferably at least 70 wt %, yet further more preferably at least 80 wt %, and most preferably at least 90 wt %.

In this case, the ratio of the carboxyl-group-containing monomer to the total amount of the nitrile monomer and carboxyl-group-containing monomer should preferably range from 10 to 70 wt %, more preferably from 15 to 60 wt %, further more preferably from 20 to 50 wt %, yet further more preferably from 25 to 45 wt %, and most preferably from 30 to 40 wt %. A ratio of the carboxyl-group-containing monomer less than 10 wt % can cause insufficiently improved heat and solvent resistance of the resultant microspheres and lead to unstable expansion performance of the resultant microspheres in a wide range of high temperature over a long period of heating. On the other hand, the ratio of the carboxyl-group-containing monomer greater than 70 wt % can cause poor expansion performance of the resultant heat-expandable microspheres.

A polymerizable component containing vinylidene chloride monomers as a monomer component will improve the gas impermeability of resultant microspheres. A polymerizable component containing (meth)acrylate ester monomers and/or styrene monomers contributes to readily controllable thermal expansion performance of resultant heat-expandable microspheres. A polymerizable component containing (meth)acrylamide monomers will lead to improved heat resistance of resultant heat-expandable microspheres.

The amount of at least one monomer selected from the group consisting of vinylidene chloride, (meth)acrylate monomers, (meth)acrylamide monomers, maleimide monomers and styrene monomers should preferably be less than 80 wt % of the monomer component, more preferably less than 50 wt %, and most preferably less than 30 wt %. A monomer component containing 80 wt % or more of the monomer can cause poor heat resistance of resultant microspheres.

The polymerizable component can contain a polymerizable monomer having at least two polymerizable double bonds (a cross-linking agent) other than the monomers mentioned above. Polymerization of the monomer component with the cross-linking agent will minimize the decrease in the amount of the blowing agent retained in thermally expanded microspheres (retention of a blowing agent encapsulated in microspheres) and achieve efficient thermal expansion of the microspheres.

The cross-linking agent is not specifically restricted, and includes, for example, aromatic divinyl compounds, such as divinylbenzene; and di(meth)acrylate compounds, such as allyl methacrylate, triacrylformal, triallyl isocyanate, ethylene glycol di(meth)acrylate, diethylene glycol di(meth)acrylate, triethylene glycol di(meth)acrylate, 1,4-butanediol di(meth)acrylate, 1,6-hexanediol di(meth)acrylate, 1,9-nonanediol di(meth)acrylate, 1,10-decanediol di(meth)acrylate, PEG (200) di(meth)acrylate, PEG (400) di(meth)acrylate, PEG (600) di(meth)acrylate, PPG (400) di(meth)acrylate, PPG (700) di(meth)acrylate, trimethylolpropane trimethacrylate, EO-modified trimethylolpropane trimethacrylate, glycerine dimethacrylate, dimethyloltricyclodecane diacrylate, pentaerythritol tri(meth)acrylate, pentaerythritol tetraacrylate, dipentaerythritol hexaacrylate, 2-butyl-2-ethyl-1,3-propanediol diacrylate, tris(2-acryloyloxyethyl) isocyanurate, triallyl isocyanurate, triallyl cyanurate, triglycidyl isocyanurate, polytetramethyleneglycol dimethacrylate, EO-modified bisphenol A dimethacrylate, neopentylglycol dimethacrylate, nonanediol diacrylate, trimethylolpropane tri(meth)acrylate and 3-methyl-1,5 pentanediol diacrylate. One of or a combination of at least two of those cross-linking agents can be used.

The amount of the cross-linking agent, which cannot be used, is not specifically restricted and should preferably range from 0.01 to 5 parts by weight to 100 parts by weight of the monomer component and more preferably from 0.1 to 1 part by weight for attaining optimum degree of cross-linking, sufficient retention of a blowing agent encapsulated in the microspheres and good heat resistance and thermal expansion of the resultant microspheres.

The polymerizable component should preferably be polymerized in the presence of a polymerization initiator. The polymerization initiator can be contained in the oily mixture along with the polymerizable component and a blowing agent.

The polymerization initiator is not specifically restricted, and includes, for example, peroxides, such as peroxydicarbonates, peroxyesters, and diacyl peroxides; and azo compounds, such as azo nitriles, azo esters, azo amides, azo alkyls and macromolecule azo initiators. One of or a combination of at least two of the polymerization initiators can be employed. The polymerization initiator should preferably be an oil-soluble polymerization initiator which is soluble in radically-polymerizable monomers.

The amount of the polymerization initiator is not specifically restricted, and should preferably range from 0.3 to 8 parts by weight to 100 parts by weight of the monomer component and more preferably from 0.6 to 7 parts by weight.

In the polymerization step, a chain transfer agent, organic pigments, and inorganic pigments or particles having hydrophobically finished surface can also be employed.

The aqueous dispersion medium for the polymerization step contains water, such as deionized water, as the main component, and disperses the oily mixture essentially containing the polymerizable component and blowing agent. The aqueous dispersion medium can further contain alcohols, such as methanol, ethanol and propanol, and hydrophilic organic solvents, such as acetone. The hydrophilic property mentioned in the present invention means a property of a substance optionally miscible in water. The amount of the aqueous dispersion medium used in the process is not specifically restricted, and should preferably range from 100 to 1000 parts by weight to 100 parts by weight of the polymerizable component.

The viscosity of the aqueous dispersion medium at 20° C. is not specifically restricted, and should preferably range from 1.5 to 80 mPa·s, more preferably from 1.7 to 70 mPa·s, further more preferably from 1.9 to 65 mPa·s, and most preferably from 2.0 to 60 mPa·s in order to constantly produce heat-expandable microspheres of small particle size. An aqueous dispersion medium having a viscosity lower than 1.5 mPa·s at 20° C. results in unstable oil globules of the oily mixture dispersed in the aqueous dispersion medium in the polymerization step and can lead to failure in producing heat-expandable microspheres. An aqueous dispersion medium having a viscosity higher than 80 mPa·s at 20° C. can cause difficulty in removing heat of reaction in the polymerization step.

The aqueous dispersion medium can further contain an electrolyte, such as sodium chloride, magnesium chloride, calcium chloride, sodium sulfate, magnesium sulfate, ammonium sulfate, and sodium carbonate. One of or a combination of at least two of these electrolyte can be used.

The amount of the electrolyte is not specifically restricted, and should preferably be less than 30 wt % of the aqueous dispersion medium, more preferably less than 25 wt %, further more preferably less than 20 wt %, yet further more preferably less than 15 wt %, still further more preferably less than 10 wt %, and most preferably less than 5 wt %. The preferable lowest limit of the amount of the electrolyte is 0 wt %. An aqueous dispersion medium containing 30 wt % or more of the electrolyte can be excessively viscous and disturb efficient production of heat-expandable microspheres of small particle size.

The aqueous dispersion medium can contain at least one water-soluble compound selected from the group consisting of potassium dichromate, zirconium sulfate, zirconium acetate, zirconium chloride, zirconium oxide, zirconium nitrate, titanium chloride, alkali metal nitrite salts, metal (III) halides, boric acid, water-soluble ascorbic acids, water-soluble polyphenols, water-soluble vitamin Bs, water-soluble phosphonic acids and phosphonate salts, and water-soluble 1,1-substitution compounds having a carbon atom bonded with a hetero atom and with a hydrophilic functional group selected from the group consisting of hydroxyl group, carboxyl group, carboxylate salt group, phosphonic acid group and phosphonate salt group. The term "water-soluble" in the present invention means a property of a substance soluble by at least 1 g in 100 g of water.

The amount of the water-soluble compound contained in the aqueous dispersion medium is not specifically restricted, and should preferably range from 0.0001 to 1.0 part by weight to 100 parts by weight of the polymerizable component, more preferably from 0.0003 to 0.1 parts by weight, and most preferably from 0.001 to 0.05 parts by weight. Insufficient amount of the water-soluble compound can fail to exert sufficient effect by the water-soluble compound. On the other hand, excessive amount of the water-soluble compound can decrease the polymerization rate or increase the amount of the residue of the polymerizable component which is the raw material of the microspheres.

In the polymerization step, the aqueous dispersion medium contains a fine-particle metal compound as a dispersion stabilizer in order to produce heat-expandable microspheres having a small particle size and excellent properties including good dispersibility. One of or a combination of at least two of the metal compounds can be used. The fine-particle metal compound is not specifically restricted, and includes, for example, calcium triphosphate, magnesium pyrophosphate and calcium pyrophosphate produced by double reaction, colloidal silica, alumina sol, zirconia sol, titania sol, and magnesium hydroxide. One of or a combination of at least two of those dispersion stabilizers can be used. Of those compounds, colloidal silica is preferable for constantly producing heat-expandable microspheres of small particle size. Colloidal silica is commercially available in a form of dispersion, in other words, a colloidal silica dispersion, and any variants having desirable mean particle sizes of silica and desirable properties including specific surface area are easily available among various grades of products, such as "Quartron" produced by Fuso Chemical Co., Ltd., "ADELITE" produced by Adeka Corporation, "SILICADOL" produced by Nippon Chemical Industrial Co., Ltd., "SNOWTEX" produced by Nissan Chemical Industries, Ltd., "Ludox" produced by DuPont, etc.

The effective concentration of colloidal silica in a colloidal silica dispersion is not specifically restricted, and preferably ranges from 10 to 28 wt %, more preferably from 13 to 26 wt %, further more preferably from 14 to 24 wt %, yet further more preferably more than 15 wt % to less than 23 wt %, still further more preferably from 16 to 22 wt %, and most preferably from 17 to 21 wt %. An effective concentration of colloidal silica beyond the range from 10 to 28 wt % can cause inefficient production of heat-expandable microspheres of small particle size.

The mean particle size of the fine-particle metal compound usually ranges from 1.0 to 10 nm, preferably from 2.0 to 9.0 nm, more preferably from 3.0 to 8.0 nm, further more preferably from 3.4 to 7.0 nm, yet further more preferably from 3.6 to 6.0 nm, still further more preferably from 3.8 to 5.5 nm, and most preferably from 4.0 to 5.0 nm. A fine-particle metal compound having a mean particle size less than 1.0 nm can make unstable globules of the oily mixture dispersed in the aqueous dispersion medium in the polymerization step to cause agglomeration of the ingredients or polymerization products. On the other hand, a fine-particle metal compound having a mean particle size greater than 10 nm needs to be added to an aqueous dispersion medium in an amount greater than usual in order to stabilize the globules of the oily mixture dispersed in the aqueous dispersion medium in the polymerization step. Consequently the resultant heat-expandable microspheres contain considerable ash and cannot be dispersed well in some applications including paints.

The mean particle size of the metal compound is defined as the average of the equivalent circular diameter (the diameter of a circle having an equal area to the projected area of a particle) of randomly-selected 500 particles of the metal compound in microphotographs magnified by 250,000 times through transmission electron microscope (H-800, manufactured by Hitachi, Ltd.).

The specific surface area of the fine-particle metal compound is not specifically restricted, and preferably ranges from 270 to 2720 $m^2/g$, more preferably from 280 to 2500 $m^2/g$, yet more preferably from 290 to 2200 $m^2/g$, still more preferably from 295 to 1800 $m^2/g$, further more preferably from 300 to 1360 $m^2/g$, yet further more preferably from 320 to 1200 $m^2/g$, still further more preferably from 340 to 900 $m^2/g$, still further more preferably from 390 to 800 $m^2/g$ and most preferably from 450 to 700 $m^2/g$.

A fine-particle metal compound having a specific surface area less than 270 $m^2/g$ needs to be added to an aqueous dispersion medium in an amount greater than usual in order to constantly produce heat-expandable microspheres having a particle size of 10 μm or less. Consequently the resultant heat-expandable microspheres contain considerable ash and cannot be dispersed well in some applications including paints. On the other hand, a fine-particle metal compound having a specific surface area greater than 2720 $m^2/g$ can make unstable globules of the oily mixture dispersed in the aqueous dispersion medium in the polymerization step to cause agglomeration of the ingredients or polymerization products.

The specific surface area of the metal compound is measured, for example, by the Sears method for measuring the specific surface area of colloidal silica. The Sears method is described in *Analytical Chemistry* (pp. 1981-1983, No. 12, vol. 28, December 1956), and the method employs the quantitative measurement of silanol group on the surface of silica sol in order to determine the specific surface area of colloidal silica. The surface area of fine-particle metal compounds other than colloidal silica is measured by the nitrogen adsorption isotherms to obtain the BET surface area according to JIS Z8830. The detailed procedure of the Sears method will be described in Examples.

The amount of the dispersion stabilizer used in the polymerization step usually ranges from 0.15 to 20 parts by weight to 100 parts by weight of the total amount of the polymerizable component and blowing agent, more preferably from 0.20 to 18 parts by weight, yet more preferably from 0.25 to 16 parts by weight, still more preferably from 0.35 to 14 parts by weight, further more preferably from 0.40 to 12 parts by weight, yet further more preferably from 0.50 to 11.5 parts by weight, and most preferably from 0.55 to 11.3 parts by weight. An amount of the dispersion stabilizer beyond the range of 0.15 to 20 parts by weight to 100 parts by weight of the total amount of the polymerizable component and blowing agent can make unstable globules of the oily mixture dispersed in the aqueous dispersion medium in the polymerization step to cause agglomeration of the ingredients or polymerization products.

The aqueous dispersion medium can contain a dispersion stabilizing auxiliary in addition to an electrolyte, water-soluble compound and dispersion stabilizer.

The dispersion stabilizing auxiliary is not specifically restricted, and includes, for example, polymeric dispersion stabilizing auxiliaries; and surfactants, such as cationic surfactants, anionic surfactants, amphoteric surfactants, and nonionic surfactants. One of or a combination of at least two of those dispersion stabilizing auxiliaries can be used.

The dispersion stabilizing auxiliary includes, for example, condensation products of diethanol amine and an aliphatic dicarboxylic acid, condensation products of urea and formaldehyde, nitrogen-containing water-soluble compounds, polyethylene oxide, tetramethylammonium hydroxide, gelatin, methyl cellulose, polyvinyl alcohol, dioctylsulfosuccinate, sorbitan ester, and emulsifiers.

The nitrogen-containing water-soluble compounds include, for example, polyvinyl pyrrolidone, polyethyleneimine, polyoxyethylene alkylamine, polydialkylaminoalkyl (meth)acrylate such as polydimethylaminoethyl (meth)acrylate, polydialkylaminoalkyl (meth)acrylamide such as polydimethylaminopropyl (meth)acrylamide, polyacrylamide, polycationic acrylamide, polyaminesulfone, and polyallylamie. Of those compounds, polyvinyl pyrrolidone is preferable.

The amount of the dispersion stabilizing auxiliary used in the polymerization step should preferably ranges from 0.10 to 5 parts by weight to 100 parts by weight of the total amount of the polymerizable component and blowing agent, more preferably from 0.15 to 4 parts by weight, and most preferably from 0.20 to 3 parts by weight. An amount of the dispersion stabilizing auxiliary beyond the range of 0.10 to 5 parts by weight to 100 parts by weight of the total amount of the polymerizable component and blowing agent can make unstable globules of the oily mixture dispersed in the aqueous dispersion medium in the polymerization step to cause agglomeration of the ingredients or polymerization products.

The aqueous dispersion medium is prepared, for example, by blending the dispersion stabilizer and optionally a water-soluble compound and/or dispersion stabilizing auxiliary with water (deionized water).

The aqueous dispersion medium in the polymerization of the present invention usually has a pH of 7 or less. The pH of the aqueous dispersion medium preferably ranges from 1.5 to 5, more preferably from 1.8 to 4.8, further more preferably from 2 to 4.5, still further more preferably from 2.2 to 4, and most preferably from 2.4 to 3.8. An aqueous dispersion medium having a pH higher than 7 in the polymerization can make unstable globules of the oily mixture dispersed in the aqueous dispersion medium in the polymerization step to cause agglomeration of the ingredients or polymerization products.

The polymerization of the process of the present invention can be carried out in the presence of sodium hydroxide or a combination of sodium hydroxide and zinc chloride.

In the polymerization step, a polymerizable component essentially containing a monomer component and optionally containing a cross-linking agent; a blowing agent; an aqueous dispersion medium essentially containing water and a fine-particle metal compound as a dispersion stabilizer and optionally containing a dispersion stabilizing auxiliary, water-soluble compound and electrolyte; and a polymerization initiator are mixed and the polymerizable component is polymerized. The order of mixing these components is not specifically restricted, and the components soluble or dispersible in the aqueous dispersion medium can be mixed with the aqueous dispersion medium prior to mixing with other components.

In the polymerization step, the oily mixture comprising a polymerizable component and blowing agent is dispersed and suspended in the aqueous dispersion medium to be formed into oil globules of a prescribed particle size.

The methods for dispersing and suspending the oily mixture include generally known dispersion techniques, such as agitation with a Homo-mixer (for example, a device produced by Primix Corporation) or Homo-disper (for example, a device produced by Primix Corporation), dispersion with a static dispersing apparatus such as a Static mixer (for example, a device produced by Noritake Engineering Co., Ltd.), membrane emulsification technique, ultrasonic dispersion, and micro-channel dispersion.

Then suspension polymerization is started by heating the dispersion in which the oily mixture is dispersed into oil globules in the aqueous dispersion medium. During the polymerization reaction, the dispersion should preferably be agitated gently to prevent the floating of monomers and sedimentation of polymerized heat-expandable microspheres.

The polymerization temperature can be settled optionally depending on the variant of the polymerization initiator, and should preferably be controlled within the range from 30 to 100° C., more preferably from 40 to 90° C., and most preferably from 50 to 85° C. The polymerization temperature should preferably be maintained for about 0.1 to 20 hours. The initial pressure for the polymerization is not specifically restricted, and should preferably be controlled within the range from 0 to 5.0 MPa in gauge pressure, more preferably from 0.1 to 3.0 MPa and most preferably from 0.2 to 2.0 MPa.

The aqueous dispersion medium containing heat-expandable microspheres after the polymerization step (hereinafter sometimes referred to as the polymerization liquid) sometimes contains byproducts such as agglomeration of heat-expandable microspheres and residue from polymerization. Such byproducts are usually larger than the particle size of the heat-expandable microspheres and do not pass a sieve of a certain mesh size. Thus the ratio of heat-expandable microspheres passing a sieve of a certain mesh size indicates the stability of producing heat-expandable microspheres and is useful for evaluating the production stability of heat-expandable microspheres. The production stability of heat-expandable microspheres should preferably be at least 80 wt %, more preferably at least 85 wt %, and most preferably at least 90 wt %. The production stability of heat-expandable microspheres less than 80 wt % indicates that the production process can face troubles which disturb efficient production of heat-expandable microspheres. The definition of the production stability of heat-expandable microspheres will be described in detail in Examples.

The aqueous dispersion medium containing heat-expandable microspheres after the polymerization step (hereinafter sometimes referred to as the polymerization liquid) is treated to isolate the heat-expandable microspheres from the aqueous dispersion medium by several isolation methods, for example, suction filtration, pressure filtration or centrifugal separation, and consequently a wet cake of the heat-expandable microspheres is obtained.

The resultant heat-expandable microspheres (usually a wet cake of heat-expandable microspheres) are dried in an oven, reduced-pressure drier or flash drier to be prepared into dry heat-expandable microspheres.

The heat-expandable microspheres can be washed with water in the process of separating the heat-expandable microspheres from the aqueous dispersion medium and drying the heat-expandable microspheres in order to remove the components of the aqueous dispersion medium other than water and refine the heat-expandable microspheres.

Heat-expandable Microspheres

Then the heat-expandable microspheres of the present invention will be explained below. The heat-expandable microspheres, as shown in FIG. 1, have a core-shell structure comprising the shell of a thermoplastic resin 11 and the core of a blowing agent 12 encapsulated therein and vaporizable by heating, and the heat-expandable microspheres have thermal expansion performance as a whole (in other words, whole of the heat-expandable microspheres expand with heating). The thermoplastic resin, the polymerizable component to be polymerized into the thermoplastic resin, the monomer component constituting the polymerizable component, and the blowing agents are as those mentioned above.

The mean particle size of the heat-expandable microspheres of the present invention usually ranges from 0.01 to 10 µm. The mean particle size of the heat-expandable microspheres can be designed freely within the range depending on their application, and is not specifically restricted. The mean particle size should preferably range from 0.05 to 9.0 µm, more preferably from 0.1 to 8.0 µm, yet more preferably from 0.5 to 7.0 µm, still more preferably from 0.7 to 6.5 µm, further more preferably from 0.8 to 6.0 µm, yet further more preferably from 0.9 to 5.5 µm, and most preferably from 1.0 to 5.0 µm. Heat-expandable microspheres having a mean particle size less than 0.01 µm cannot have sufficient expansion performance, while heat-expandable microspheres having a mean particle size greater than 10 µm cannot be suitable for application to a material which is required to have smooth surface.

The coefficient of variation, CV, of the particle size distribution of the heat-expandable microspheres is not specifically restricted, and should preferably be not greater than 35%, more preferably not greater than 30%, and most preferably not greater than 25%. The CV can be calculated by the following expressions (1) and (2).

[Expression 1]

$$CV = (s/\langle x \rangle) \times 100 \text{ (percent)} \qquad (1)$$

$$s = \left\{ \sum_{i=1}^{n} (xi - \langle x \rangle)^2 / (n-1) \right\}^{1/2} \qquad (2)$$

(where "s" is a standard deviation of the particle size of the microspheres, "$\langle x \rangle$" is a mean particle size of the microspheres, "xi" is the particle size of the i-th particle, and "n" represents the number of particles).

The encapsulation ratio of the blowing agent is defined to be the weight percentage of the blowing agent encapsulated in heat-expandable microspheres to the weight of the heat-expandable microspheres. The encapsulation ratio of the blowing agent is not specifically restricted, and is optionally determined depending on the application of the resultant heat-expandable microspheres. The encapsulation ratio should preferably range from 1 to 35%, more preferably from 2 to 30%, and most preferably from 3 to 25%. An encapsulation ratio of the blowing agent less than 1% can lead to insufficient effect by the blowing agent. On the other hand, an encapsulation ratio of the blowing agent higher than 35% can excessively thin the shell of heat-expandable microspheres to make the blowing agent escape through the shell and decrease the heat resistance and expansion performance of the microspheres.

The expansion-initiation temperature (Ts) of the heat-expandable microspheres is not specifically restricted, and should preferably range from 60 to 250° C., more preferably from 70 to 230° C., further more preferably from 80 to 200° C., yet further more preferably from 90 to 180° C., and most preferably from 100 to 160° C. Heat-expandable microspheres having an expansion-initiation temperature lower than 60° C. can have poor storage stability and cannot be suitable for blending with compositions, such as paints and resins.

The maximum expansion temperature ($T_{max}$) of the heat-expandable microspheres is not specifically restricted, and should preferably range from 80 to 300° C., more preferably from 90 to 280° C., further more preferably from 100 to 250° C., yet further more preferably from 110 to 230° C., and most preferably from 120 to 210° C. Heat-expandable microspheres having a maximum expansion temperature lower than 80° C. cannot be suitable for blending with compositions, such as paints and resins.

The amount of ash contained in the heat-expandable microspheres should preferably be not higher than 10 wt %, more preferably not higher than 9.5 wt %, yet more preferably not higher than 9.0 wt %, still more preferably not higher than 8.5 wt %, further more preferably not higher than 8.0 wt %, and most preferably not higher than 7.5 wt %. The heat-expandable microspheres containing ash in an amount higher than 10 wt % can inhibit the reduction of the weight of the compositions or formed products blended with the heat-expandable microspheres or the hollow particles mentioned below and adversely affect the physical properties of those compositions and products. The ash contained in heat-expandable microspheres is estimated to be derived from the metal compound, and the desirable lower limit of the ash in heat-expandable microspheres is 0 wt %.

The amount of silicon contained in the heat-expandable microspheres should preferably be not higher than 10 wt %, more preferably not higher than 9 wt %, yet more preferably not higher than 8 wt %, still more preferably not higher than 7 wt %, further more preferably not higher than 6 wt %, yet further more preferably not higher than 5 wt %, still further more preferably not higher than 4.5 wt %, still further more preferably not higher than 4 wt %, still further more preferably not higher than 3.5 wt %, still further more preferably not higher than 3 wt %, and most preferably not higher than 2.5 wt %. The heat-expandable microspheres containing silicon in an amount higher than 10 wt % can result in poor dispersibility of the microspheres and the hollow particles mentioned below in compositions or formed products blended with those microspheres and hollow particles. The desirable lower limit of the silicon in the heat-expandable microspheres is 0 wt %.

Hollow Particles

The hollow particles of the present invention are produced by thermally expanding the heat-expandable microspheres mentioned above or the heat-expandable microspheres produced in the process mentioned above.

The hollow particles of the present invention are lightweight and improve the physical properties of a composition or formed product blended with the hollow particles. The hollow particles blended with, for example, paint compositions can control the increase in the viscosity of the paint compositions to improve their physical properties.

The process for producing the hollow particles includes dry thermal expansion methods and wet thermal expansion methods. The thermal expansion temperature for the heat-expandable microspheres preferably ranges from 60° C. to 350° C.

The mean particle size of the hollow particles is not specifically restricted, and can be optionally designed depending on the application of the hollow particles. The mean particle size should preferably range from 0.1 to 1000 μm, and more preferably from 0.8 to 200 μm. The coefficient of variation, CV, of the particle size distribution of the hollow particles is not specifically restricted, and should preferably be not greater than 30%, and more preferably not greater than 25%.

The amount of the ash contained in the hollow particles should preferably be not higher than 10 wt %, more preferably not higher than 9.5 wt %, yet more preferably not higher than 9.0 wt %, still more preferably not higher than 8.5 wt %, further more preferably not higher than 8.0 wt %, and most preferably not higher than 7.5 wt %. The hollow particles containing ash in an amount higher than 10 wt % can inhibit the reduction of the weight of the compositions or formed products blended with the hollow particles, and can adversely affect the physical properties of the compositions and products. The ash contained in the hollow particles is estimated to be derived from the metal compound, and the desirable lower limit of the ash in the hollow particles is 0 wt %.

The amount of silicon contained in the hollow particles should preferably be not higher than 5 wt %, more preferably not higher than 4.5 wt %, yet more preferably not higher than 4 wt %, still more preferably not higher than 3.5 wt %, further more preferably not higher than 3 wt %, and most preferably not higher than 2.5 wt %. The hollow particles containing silicon in an amount higher than 5 wt % can result in poor dispersibility of the hollow particles in compositions or formed products blended with the hollow particles. The desirable lower limit of the silicon in hollow particles is 0 wt %.

The true specific gravity of the hollow particles is not specifically restricted, and should preferably range from 0.010 to 0.5, more preferably from 0.015 to 0.3 and most preferably from 0.020 to 0.2.

Figure 2:
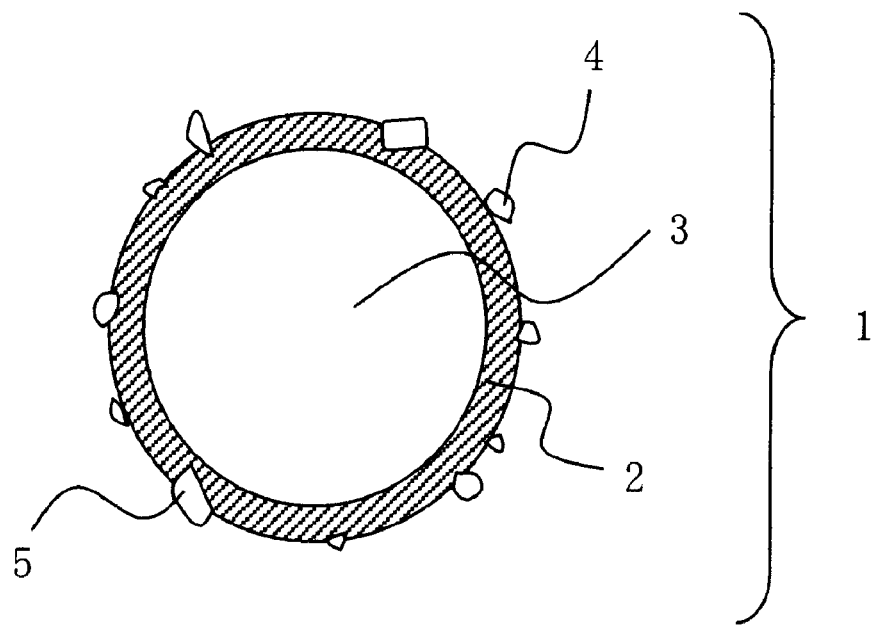
FIG. 2 is a schematic diagram of an example of the hollow particles

The hollow particles (1) can include a fine particle (4 and 5) coating the outer surface of their shell (2) as shown in FIG. 2, and such hollow particles are hereinafter sometimes referred to as fine-particle-coated hollow particles (1).

The coating mentioned here mean that the fine particle (4 or 5) is in a state of adhesion (4) on the outer surface of the shell (2) of the fine-particle-coated hollow particles (1), or in a state of fixation in a dent (5) on the outer surface of the shell of the fine-particle-coated hollow particles as the result of the fine particle pushing into the thermoplastic resin shell melted by heat. The particle shape of the fine particle can be irregular or spherical. The fine-particle-coated hollow particles have improved handling property.

The mean particle size of the fine particle is not specifically restricted, and is selected depending on hollow particles to be coated. The mean particle size of the fine particle should preferably range from 0.001 to 30 μm, more preferably from 0.005 to 25 μm, and most preferably from 0.01 to 20 μm.

The fine particle can be selected from various materials including both inorganic and organic materials. The shape of the fine particle includes spherical, needle-like and plate-like shapes.

The mean particle size of the fine particle should preferably be 1/10 or less of the mean particle size of the fine-particle-coated hollow particles. The mean particle size mentioned here means the mean particle size of primary particles.

The fine-particle-coated hollow particles can be blended in a composition mentioned below, and such composition is useful as, for example, an adhesive composition.

The fine-particle-coated hollow particles can be produced by thermally expanding fine-particle-coated heat-expandable microspheres. The preferable process for producing the fine-particle-coated hollow particles includes the steps of blending heat-expandable microspheres and a fine particle (blending step), and heating the mixture prepared in the blending step at a temperature higher than the softening point of the thermoplastic resin constituting the shell of the heat-expandable micro spheres to expand the heat-expandable microspheres and simultaneously coat the outer surface of the shell of the resultant hollow particles with the fine particle (coating step).

The true specific gravity of the fine-particle-coated hollow particles is not specifically restricted, and should preferably range from 0.01 to 0.5, more preferably from 0.03 to 0.4, further more preferably from 0.05 to 0.35, and most preferable from 0.07 to 0.30. The fine-particle-coated hollow particles having a true specific gravity less than 0.01 can have poor durability. On the other hand, the fine-particle-coated hollow particles having a true specific gravity greater than 0.5 can be poorly effective for decreasing the specific gravity of compositions, because greater amount of the fine-particle-coated hollow particles is required for blending with the compositions leading to poor cost performance.

The moisture content of the hollow particles is not specifically restricted, and should preferably be not higher than 0.5 wt %, more preferably not higher than 0.4 wt %, further more preferably not higher than 0.35 wt %, and most preferably not higher than 0.3 wt %. The lower limit of the moisture content of the hollow particles is 0 wt %. The moisture is present in the hollow particles in a form like crystalline water.

Compositions and Formed Products

The composition of the present invention contains at least one particulate material selected from the group consisting of the heat-expandable microspheres mentioned above, the heat-expandable microspheres produced in the process for producing heat-expandable microspheres mentioned above and the hollow particles mentioned above, and a base component. Thus the composition of the present invention contains minimum amount of agglomeration of the particulate materials due to poor dispersibility of them and is processed into a product having smooth surface.

The base component is not specifically restricted, and includes, for example, rubbers, such as natural rubber, butyl rubber, silicone rubber, and ethylene-propylene-diene rubber (EPDM); thermosetting resins, such as unsaturated polyesters, epoxy resins and phenol resins; waxes, such as polyethylene waxes and paraffin waxes; thermoplastic resins, such as ethylene-vinyl acetate copolymers (EVA), ionomers, polyethylene, polypropylene, polyvinyl chloride (PVC), acrylic resin, thermoplastic polyurethane, acrylonitrile-styrene copolymer (AS resin), acrylonitrile-butadiene-styrene copolymer (ABS resin), and polystyrene (PS); thermoplastic elastomers, such as olefin-based elastomers and styrene-based elastomers; bioplastics, such as polylactic acid (PLA) and starch resins; sealing materials, such as modified silicone-based materials, silicone-based materials, urethane-based materials, polysulfide-based materials, acrylate-based materials, polyisobutylene-based materials, and butyl rubber-based materials; paint components, such as urethane polymers, ethylene-vinyl acetate copolymers, vinyl chloride polymers, and acrylate polymers; inorganic materials, such as cement, mortar, and cordierite; and negative electrode active materials and negative electrode binders in a slurry composition for the negative electrode of a lithium-ion secondary battery mentioned later.

The amount of the particulate materials contained in the composition of the present invention is not specifically restricted, and should preferably range from 0.1 to 30 wt %, more preferably from 0.3 to 25 wt %, and most preferably from 0.5 to 20 wt %, in order to attain better weight reduction of the resultant products and uniformity of the compositions prepared by blending the particulate materials.

The composition can contain additives in addition to the base component and the particulate materials. The additives include fillers conventionally used for weight reduction, such as perlite, fly ash, shirasu balloon, glass balloon, phenol balloon, carbon balloon, alumina bubble and expandable styrene beads; reinforcing materials, such as glass fiber and aramid fiber; fillers, such as silica, talc and calcium carbonate; and pigments, such as titanium oxide and magnesium oxide. One of or a combination of at least two of those additives can be used.

The composition of the present invention is prepared by mixing the base components and the particulate materials.

The application of the composition of the present invention includes, for example, molding compositions, paint compositions, clay compositions, fiber compositions, adhesive compositions, powder compositions, and slurry compositions for electrodes. Specifically, the composition of the present invention can be used to impart anti-shrink, lightweight or thermal insulation properties to cosmetics, putties, paints, sealants, mortar, paper clay, ceramic and artificial marble and can be incorporated in a slurry composition for the negative electrode of lithium-ion secondary batteries. The detail of the lithium-ion secondary batteries will be mentioned later.

The formed product of the present invention can be produced by forming the composition. The formed product of the present invention includes, for example, molded products and coating films. The formed product of the present invention has high dynamic durability, improved properties including lightweight effect, porosity, sound absorbing performance, thermal insulation, design potential, shock absorbing performance and strength, and low thermal conductivity and dielectric property.

The formed product of the present invention produced from the composition mentioned above has lightweight property and smooth surface.

The molded product containing an inorganic material as a base component is calcined into ceramic filters, etc. containing closed cells.

A cured paint composition produced as a formed product of the present invention is preferable for its good surface property, and the cross section of the product after cutting is smooth enough.

Lithium-ion Secondary Battery

A lithium-ion secondary battery comprises a positive electrode, negative electrode, liquid electrolyte and separator.

Slurry Composition for a Negative Electrode of a Lithium-ion Battery

The slurry composition for a negative electrode of a lithium-ion secondary battery of the present invention contains a negative electrode binder, negative electrode active material, water-soluble polymer, and at least one particulate material selected from the group consisting of the heat-expandable microspheres mentioned above, heat-expandable microspheres produced in the method mentioned above and hollow particles mentioned above. The composition can contain a conductive auxiliary added optionally. The amount of hollow particles in the slurry composition for the negative electrode of a lithium-ion secondary battery (hereinafter sometimes referred to as the slurry composition for the negative electrode) should preferably range from 0.1 to 5 parts by weight to 100 parts by weight of the negative electrode active material, more preferably from 0.5 to 4 parts by weight, and most preferably from 0.5 to 3 parts by weight. Excessive amount of the hollow particles in the slurry composition for the negative electrode can deteriorate the output property of resultant lithium-ion secondary battery. In addition, an amount of the hollow particles in the slurry composition for the negative electrode beyond the range mentioned above can shorten the lifespan of resultant lithium-ion secondary battery.

The order of dispersing or dissolving a negative electrode binder, negative electrode active material, water-soluble polymer, hollow particles, and an optionally-added conductive auxiliary in a solvent is not specifically restricted, and various blending processes can be employed, for example, adding a negative electrode binder, negative electrode active material, water-soluble polymer, hollow particles and a conductive auxiliary to a solvent to make a mixture; dissolving a water-soluble polymer in a solvent, adding a negative electrode active material and conductive auxiliary to the solution to make a mixture and finally adding a negative electrode binder previously dispersed in a solvent (for example, a latex) to the mixture; and adding a negative electrode active material and conductive auxiliary to a negative electrode binder previously dispersed in a solvent to make a mixture, adding a water-soluble polymer dissolved in a solvent to the mixture, and finally adding hollow particles to the mixture.

The negative electrode binder should preferably be an aqueous binder, and SBR binders and polyacrylate binders can be employed.

A substance employable for the negative electrode active material generally absorbs and desorbs lithium ions at the negative electrode of a lithium-ion secondary battery.

The negative electrode active material includes, for example, a carbon-based negative electrode active material, such as natural graphite, artificial graphite and carbon black. Of those materials, natural graphite and artificial graphite are preferable for providing compromise between high capacitance and long lifespan of a lithium-ion secondary battery.

Another example of a negative electrode active material preferable for a lithium-ion secondary battery is a negative electrode active material containing metals. In particular, a negative electrode active material containing at least one metal selected from the group consisting of tin, silicon, germanium and lead is preferable. A negative electrode active material containing these elements is effective to decrease the irreversible capacity of batteries.

The water-soluble polymer is not specifically restricted, and includes, for example, cellulose polymers, such as carboxymethyl cellulose, methyl cellulose, ethyl cellulose and hydroxypropyl cellulose; ammonium salts or alkali metal salts of the cellulose polymers; alginates, such as propylene glycol alginate; alginate salts, such as sodium alginate; polyacrylic acids; polyacrylate salts (or methacrylate salts) such as sodium polyacrylate (methacrylate); and other polymers such as polyvinyl alcohol, modified polyvinyl alcohol, polyethylene oxide, polyvinylpyrrolidone, polycarboxylic acid, oxidized starch, starch phosphate, casein, modified starches, chitin, chitosan derivatives, xanthan gum, ammonium polycarboxylate, and polyoxyalkylene surfactants. The term "(modified) poly-" means "unmodified poly-" or "modified poly-".

One of or a combination of at least two of these water-soluble polymers can be used. Of those polymers, cellulose polymers are preferable, and carboxymethyl cellulose and its ammonium salts or alkali metal salts are more preferable.

The mean particle size of the heat-expandable microspheres added to the slurry composition for the negative electrode of a lithium-ion secondary battery should preferably range from 0.01 to 20 μm, more preferably from 0.1 to 15 μm and most preferably from 1.0 to 10 μm. The heat-expandable microspheres having a mean particle size beyond the range from 0.01 to 20 μm can shorten the battery lifespan.

The mean particle size of hollow particles added to the slurry composition for the negative electrode of a lithium-ion secondary battery should preferably range from 0.1 to 40 μm, more preferably from 0.5 to 30 μm and most preferably from 1.0 to 20 μm. The hollow particles having a mean particle size beyond the range from 0.1 to 40 μm can shorten the battery lifespan.

The maximum expansion temperature of the heat-expandable microspheres to be expanded into the hollow particles added to the slurry composition for the negative electrode of a lithium-ion secondary battery should preferably range from 70 to 150° C., more preferably from 80 to 140° C., and most preferably from 90 to 130° C. A maximum expansion temperature of the heat-expandable microspheres beyond the range from 70 to 150° C. can shorten the battery lifespan.

The amount of the ash contained in the hollow particles added to the slurry composition for the negative electrode of a lithium-ion secondary battery should preferably be not higher than 10 wt %, more preferably not higher than 9.5 wt %, yet more preferably not higher than 9.0 wt %, still more preferably not higher than 8.5 wt %, further more preferably not higher than 8.0 wt %, and most preferably not higher than 7.5 wt %. The hollow particles containing ash in an amount higher than 10 wt % can shorten the lifespan of the lithium-ion secondary battery to which the hollow particles are added. The ash contained in hollow particles is estimated to be derived from the metal compound, and the desirable lower limit of the ash in hollow particles is 0 wt %.

The amount of silicon contained in the hollow particles added to the slurry composition for the negative electrode of a lithium-ion secondary battery should preferably be not higher than 5 wt %, more preferably not higher than 4.5 wt %, yet more preferably not higher than 4 wt %, still more preferably not higher than 3.5 wt %, further more preferably not higher than 3 wt %, and most preferably not higher than 2.5 wt %. The hollow particles containing silicon in an amount higher than 5 wt % can cause swelling of the negative electrode containing the hollow particles by the liquid electrolyte and lead to peeling of the negative electrode active material. The desirable lower limit of the silicon in the hollow particles is 0 wt %.

The true specific gravity of the hollow particles added to the slurry composition for the negative electrode of a lithium-ion secondary battery is not specifically restricted, and should preferably range from 0.010 to 0.5, more preferably from 0.015 to 0.3, and most preferably from 0.020 to 0.2.

The conductive auxiliary is a conductive material which is not specifically restricted, and should preferably be a conductive particulate material including, for example, conductive carbon black, such as furnace black, acetylene black and Ketjenblack; graphites, such as natural graphite and artificial graphite; and carbon fibers, such as PAN carbon fiber, petroleum pitch carbon fiber and vapor grown carbon fiber. The mean particle size of particulate conductive auxiliaries is not specifically restricted, and is preferably be smaller than the mean particle size of the negative electrode active material, in other words, preferably ranges from 0.001 to 10 μm, more preferably from 0.05 to 5 μm and most preferably from 0.1 to 1 μm to achieve sufficient conductivity with minimum amount added.

Negative Electrode of a Lithium-ion Secondary Battery

The negative electrode of a lithium-ion secondary battery is prepared in a method, for example, a method comprising the steps of applying the aforementioned slurry composition for the negative electrode of a lithium-ion secondary battery to a current collector, and drying the slurry composition.

Specifically, a slurry composition for the negative electrode is prepared and applied to a current collector. The slurry composition for the negative electrode can be applied to one side or both sides of the current collector. The slurry composition for the negative electrode has good dispersibility and can be uniformly applied with ease. Filtration of the slurry composition before application improves the uniformity of the negative electrode active material layer on the current collector. The amount of the slurry composition applied to the current collector preferably ranges from 10 to 20 mg/cm$^2$.

The materials for the current collector include, for example, metals, carbon and conductive polymers, and metals are preferable. The metals usually used for the current collector include copper, aluminum, platinum, nickel, tantalum, titanium, stainless steel, and other alloys. Of those metals, copper, aluminum and aluminum alloys are preferable for their electrical conductivity and voltage endurance. Pure aluminum as disclosed in Japanese patent application publication 2001-176757 is preferable for a current collector required high voltage endurance. The current collector is generally formed into a film or sheet, and their thickness is selected depending on the application. The thickness should preferably range from 1 to 200 μm, more preferably from 5 to 100 μm and most preferable from 10 to 50 μm.

The method for applying the slurry composition is not specifically restricted, and includes, for example, doctor blade coating, dip coating, reverse roll coating, direct roll coating, gravure roll coating, extrusion coating, and brush coating. The slurry composition applied on the current collector forms a film. The thickness of the film of the slurry composition can be optionally selected depending on the intended thickness of the negative electrode active material layer.

After the application, the film of the slurry composition is dried to remove the solvent such as water. Thus the negative electrode active material layer containing the particulate negative electrode binder, negative electrode active material, water-soluble polymer and conductive auxiliary optionally added is formed on the surface of the current collector to manufacture a negative electrode of a lithium-ion secondary battery.

The temperature and time for drying the slurry composition film are not specifically restricted. For example, the film can be heated at 120° C. or higher temperature for 1 hour or longer. The method for drying the film includes warm-air drying, hot-air drying, low-humidity-air drying, vacuum drying, and drying with infrared radiation, far-infrared radiation or electron-beam radiation.

After forming the negative electrode active material layer on the current collector, the layer should preferably be pressed with a press mold or roll press. The pressing decreases the void ratio in the negative electrode.

If the negative electrode active material layer contains a curable polymer, the polymer can be cured after forming the negative electrode active material layer.

Positive Electrode

The positive electrode of an electrochemical element is made by laminating a positive electrode active material onto a current collector. The positive electrode of an electrochemical element is manufactured by applying the slurry composition for positive electrode containing a positive electrode active material, positive electrode binder, a solvent for preparing positive electrode, and other components optionally added, such as water-soluble polymer and conductive auxiliary, to the surface of a current collector and drying the slurry. In other words, a positive electrode active material layer is formed by applying the slurry composition for the positive electrode to the surface of the current collector and drying the slurry.

Substances employable for the positive electrode active material for a lithium-ion secondary battery are able to dope and de-dope lithium ions, and they fall into two categories of inorganic and organic compounds.

The inorganic positive electrode active materials include transition metal oxides, transition metal sulfates and lithium-containing combined metal oxides which are composed of lithium and transition metals. The transition metals include Ti, V, Cr, Mn, Fe, Co, Ni, Cu, Mo, etc.

The transition metal oxides include MnO, $MnO_2$, $V_2O_5$, $V_6O_{13}$, $TiO_2$, $Cu_2V_2O_3$, amorphous $V_2O$—$P_2O_5$, $MoO_3$, $V_2O_5$, $V_6O_{13}$, etc. Of those metal oxides, MnO, $V_2O_5$, $V_6O_{13}$ and $TiO_2$ are preferable for good cycle durability and high capacity of the resultant batteries. The transition metal sulfates include $TiS_2$, $TiS_3$, amorphous $MoS_2$, FeS, etc. The lithium-containing combined metal oxides include the lithium-containing combined metal oxides having layered structure, spinel structure and olivine structure.

The organic compounds for the positive electrode active material include, for example, conductive polymers, such as polyacetylene and poly-p-phenylene. Iron-based oxides having poor conductivity can be used for the positive electrode active material after coating their surface with a carbon material by reduction-baking in the presence of a carbon source. These compounds can be partially substituted with some elements. The positive electrode active material can be the mixture of the inorganic and organic compounds mentioned above.

The positive electrode binder includes, for example, resins, such as polyethylene, polytetrafluoroethylene (PTFE), polyvinylidene fluoride (PVDF), tetrafluoroethylene-hexafluoropropylene copolymer (FEP), polyacrylate derivatives, and polyacrylonitrile derivatives; and soft polymers, such as acrylic-based soft polymers, diene-based soft polymers, olefin-based soft polymers and vinyl-based soft polymers. The positive electrode binder can be used alone, or at least two of the positive electrode binders combined in an optional ratio can be used.

The water-soluble polymer and conductive auxiliary added to the slurry composition for the negative electrode mentioned above can be used for the water-soluble polymer and conductive auxiliary optionally added to the slurry composition for the positive electrode.

The solvent used for the preparation of the positive electrode can be water or an organic solvent. The organic solvent includes, for example, alicyclic hydrocarbons, such as cyclopentane and cyclohexane; aromatic hydrocarbons, such as toluene and xylene; ketones, such as methyl ethyl ketone and cyclohexanone; esters, such as ethyl acetate, butyl acetate, γ-butyrolactone and ε-caprolactone; acylonitriles, such as acetonitrile and propionitrile; ethers, such as tetrahydrofuran and ethyleneglycol diethylether; alcohols, such as methanol, ethanol, isopropanol, ethylene glycol and ethyleneglycol monomethyl ether; and amides, such as N-methylpyrrolidone and N,N-dimethylformamide. Of those solvents, N-methylpyrrolidone (NMP) is preferable. The solvents can be used alone or at least two of the solvents combined in an optional ratio can be used. Especially, water is preferable as the solvent.

The amount of the solvent can be adjusted to make desirable viscosity of the slurry composition for the positive electrode for applying. Specifically, the amount of the solvent should be adjusted to make the solid concentration of the slurry composition for the positive electrode preferably ranging from 30 to 90 wt %, and more preferably from 40 to 80 wt %.

For the positive electrode current collector, a current collector like as the negative electrode current collector of the lithium-ion secondary battery mentioned above can be used.

The slurry composition for the positive electrode can be applied to the surface of the current collector in any method which is not specifically restricted. The method include, for example, doctor blade coating, dip coating, reverse roll coating, direct roll coating, gravure roll coating, extrusion coating, and brush coating.

The method for drying the slurry includes warm-air drying, hot-air drying, low-humidity-air drying, vacuum drying, and drying with infrared radiation, far-infrared radiation or electron-beam radiation. The time and temperature for the drying should preferably range from 5 to 30 minutes and from 40 to 180° C., respectively.

After the slurry composition for the positive electrode is applied to the surface of the current collector and dried, the resultant positive electrode active material layer should preferably be pressed with a press mold or roll press if required. The pressing decreases void ratio in the positive electrode active material layer. The void ratio in the layer should preferably be at least 5% and more preferably at least 7%, and should preferably be not higher than 30% and more preferably not higher than 20%. Smaller void ratio in the layer results in low capacitance per volume of the layer and make the layer apt to separate from the current collector. On the other hand, larger void ratio in the layer decreases charging and discharging efficiency of the battery.

If the positive electrode active material layer contains a curable polymer, it is preferable to cure the polymer after forming the positive electrode active material layer.

Separator

The material for the separator of the lithium-ion secondary battery includes, for example, microporous membranes or nonwovens impregnated with polyolefin resins, such as polyethylene and polypropylene, and aromatic polyamide resin; and porous resin coat containing inorganic ceramic powder. Specifically, the material includes microporous membranes of polyolefin resins (polyethylene, polypropylene, polybutene and polyvinyl chloride resins), mixed polyolefin resins or polyolefin copolymer resins; microporous membranes of polyethylene terephthalate, polycycloolefin, polyethersulfone, polyamide, polyimide, polyimideamide, polyaramide, polycycloolefin, nylon and polytetrafluoroethylene; woven or nonwoven fabrics of polyolefin fiber; and aggregates of particulate insulation material. Of those materials, microporous membranes of polyolefin resins are preferable for making thin separator which contributes to increased ratio of the active material in a lithium-ion secondary battery to increase its capacity per volume.

Liquid Electrolyte

The material for the electrolyte of a lithium-ion secondary battery includes, for example, a non-aqueous electrolyte prepared by dissolving a supporting electrolyte in a non-aqueous solvent. Lithium salts are preferably used for the supporting electrolyte, and include, for example, $LiPF_6$, $LiAsF_6$, $LiBF_4$, $LiSbF_6$, $LiAlCl_4$, $LiClO_4$, $CF_3SO_3Li$, $C_4F_9SO_3Li$, $CF_3COOLi$, $(CF_3CO)_2NLi$, $(CF_3SO_2)_2NLi$, and $(C_2F_5SO_2)NLi$. Of those lithium salts, $LiPF_6$, $LiClO_4$ and $CF_3SO_3Li$ are preferable for their high solubility and dissociation degree in solvent. These salts can be used alone or at least two of these salts combined in an optional ratio can be used. Supporting electrolytes of higher dissociation degree result in higher lithium ion conductivity, and they are selected depending on the desirable lithium ion conductivity.

The concentration of the supporting electrolyte in the liquid electrolyte should preferably range from 0.5 to 2.5 M depending on the variant of the supporting electrolyte. Insufficient or excessive concentration of the supporting electrolyte can decrease the ionic conductivity.

The non-aqueous solvent is not specifically restricted except that the solvent can dissolve the supporting electrolyte. The non-aqueous solvent include, for example, carbonates, such as dimethyl carbonate (DMC), ethylene carbonate (EC), diethyl carbonate (DEC), propylene carbonate (PC), butylene carbonate (BC) and methylethyl carbonate (MEC); esters, such as γ-butyrolactone and methyl formate; ethers, such as 1,2-dimethoxyethane and tetrahydrofuran; sulfur-containing compounds, such as sulfolane and dimethylsulfoxide; and liquid ions also used as a supporting electrolyte. Of those solvents, carbonates are preferable for their high permittivity and widely stable electrochemical window. The non-aqueous solvents can be used alone or at least two of the solvents combined in an optional ratio can be used. Generally, lower viscosity of the non-aqueous solvent makes higher lithium ion conductivity and higher permittivity of the non-aqueous solvent results in higher solubility of a supporting electrolyte. There is a tradeoff between the viscosity and permittivity of the non-aqueous solvent, and it is preferable to adjust the lithium ion conductivity by selecting the non-aqueous solvents and their blend ratio. A solvent made by substituting whole or part of the hydrogen with fluorine can be blended to the non-aqueous solvent or can be used as the non-aqueous solvent.

The liquid electrolyte can contain an additive. The additive includes, for example, carbonates, such as vinylene carbonate (VC); sulfur-containing compound, such as ethylene sulfite (ES); and fluorine-containing compound, such as fluoroethylene carbonate (FEC). The additive can be used alone or at least two of the additives combined in an optional ratio can be used.

Making a Lithium-ion Secondary Battery

The process for making a lithium-ion secondary battery includes, for example, layering a positive electrode and negative electrode with a separator sandwiched between them, rolling or folding the layered material into the shape of an intended battery to place in a battery casing, and sealing the casing after it is filled with a liquid electrolyte. Optionally, expanded metal, over-current protective elements including a fuse and PTC thermistor, and a lead plate can be incorporated in the battery to prevent increase in the internal pressure and excessive charge and discharge. The shape of the lithium-ion secondary battery can be any of coin, button, sheet, cylindrical, rectangular and flat. The material for the battery casing is not specifically restricted, and any of materials which prevent moisture penetration into batteries, such as metals and aluminum laminate, can be employed.

The lithium-ion secondary battery of an embodiment of the present invention has a long lifespan.

EXAMPLES

The present invention will be specifically described with the following Examples and Comparative examples, though the present invention is not restricted within the scope of those Examples and Comparative examples. In the following Examples and Comparative examples, "part(s)" means "part(s) by weight" unless otherwise specified.

The properties of the ingredients and products and the processing conditions mentioned in the following Examples and Comparative examples were tested and determined by the methods described below.

Viscosity of Aqueous Dispersion Medium

The viscosity of the aqueous dispersion medium at 20° C. was measured with a viscometer, BLII, manufactured by Toki Sangyou Co., Ltd.

Specific Surface Area of Colloidal Silica

The specific surface area of colloidal silica was measured by the Sears method described below.

1) Weigh W (g) of colloidal silica containing 1.5 g of silicon dioxide ($SiO_2$) in a beaker. After conditioning at 25° C. in a thermostatic chamber, add pure water to 90 mL. Then carry out the following operations in a thermostatic chamber at 25° C.

2) Add 0.1-N hydrogen chloride solution to the sample to make the pH 3.6.

3) Add 30 g of sodium chloride (reagent grade) to the sample, add pure water to 150 mL and agitate for 10 min.

4) Place a pH electrode in the sample, and adjust the pH of the sample at 4.0 by dropping 0.1-N sodium hydroxide aqueous solution into the sample with agitation.

5) After adjusting the pH at 4.0, titrate the sample with 0.1-N sodium hydroxide aqueous solution. Record the titer and pH at least 4 times within the pH range from 8.7 to 9.3, and prepare the calibration curve based on the titer of the 0.1-N sodium hydroxide aqueous solution, X, and the pH with the titer, Y.

6) Calculate the corrected amount, V (mL), of 0.1-N sodium hydroxide aqueous solution required to change the pH of the sample containing 1.5 g of silicon dioxide from 4.0 to 9.0 by the following expression (A), and determine the specific surface area, SA ($m^2/g$), by the following expression (B).

$$V=(A \times f \times 100 \times 1.5)/(W \times C) \quad (A)$$

$$SA=29.0V-28 \quad (B)$$

The symbols in the expressions (A) and (B) mean as follows.

A: the actual amount (mL) of the 0.1-N sodium hydroxide aqueous solution added to the sample containing 1.5 g of silicon dioxide in order to change the pH of the sample from 4.0 to 9.0 f: the factor of the 0.1-N sodium hydroxide aqueous solution

C: the concentration (%) of silicon dioxide in the colloidal silica

W: the amount of colloidal silica (g) weighed in the beaker pH

The pH values were determined with a pH meter (HM-12P, manufactured by DKK-Toa Corporation).

Mean Particle Size and Particle Size Distribution

Heat-expandable microspheres were analyzed in wet system of a laser diffraction particle size analyzer (HEROS & RODOS, manufactured by SYMPATEC), and the mean volume diameter, $D_{50}$, determined in the analysis was defined as the mean particle size.

Encapsulation Ratio of a Blowing Agent

The moisture content, Cw (%), of heat-expandable microspheres after drying was determined with a Karl Fischer moisture meter (MKA-510N, manufactured by Kyoto Electronics Manufacturing Co., Ltd.). One gram of dried heat-expandable microspheres was placed in a stainless steel evaporating dish (15 mm deep and 80 mm in diameter), and weighed out ($W_3$) (%). Then 30 mL of acetonitrile was added to disperse the microspheres uniformly. After leaving for 2 hours at room temperature, the microspheres were dried at 110° C. for 2 hours, and the dry weight ($W_4$) (%) was determined. The encapsulation ratio of the blowing agent, $CR_2$ (wt %), was calculated by the following expression (C).

$$CR_2=((W_3-W_4)/1.0) \times 100-Cw \quad (C)$$

Polymerization State

1) Production Stability

An aqueous dispersion medium containing polymerized heat-expandable microspheres was prepared in an amount of $W_6$ (g) and sifted with a metal sieve (200 µm mesh, manufactured by Kansai Wire Netting Co., Ltd.). The weight of the aqueous dispersion medium passing the sieve, $W_5$ (g), was measured. The ratio of the aqueous dispersion medium passing the sieve, Y (wt %), was calculated from $W_5$ (g) and $W_6$ (g) by the following expression (D).

$$Y(\text{wt \%})=(W_5/W_6) \times 100 \quad (D)$$

According to the sieve passing ratio, Y (wt %), the production stability was evaluated in accordance with the following criteria.

Bad: Y<80 wt %

Good: Y≥80 wt %

2) Heat Generation in Polymerization Reaction

The heat generation in polymerization reaction was evaluated according to the following criteria.

Good: the total of the time when a temperature difference greater than 3° C. was found between the temperatures of the liquid in the compressive reactor (1.5-liter capacity) and the hot water bath (20-liter capacity) controlling the temperature of the compressive reactor was shorter than 1 min throughout the polymerization reaction Bad: the total of the time when a temperature difference greater than 3° C. was found between the aforementioned temperatures was 1 min or longer throughout the polymerization reaction Ash in Heat-expandable Microspheres Dried heat-expandable microspheres were placed in a crucible in an amount of Wp (g) and heated with an electric heater at 700° C. for 30 min to be ignited into ash, and the weight of the resultant ash, Wq (g), was measured. The ash in the heat-expandable microspheres, CA (wt %), was calculated from Wp (g) and Wq (g) by the following expression (D).

$$CA=Wq/Wp \times 100 \quad (D)$$

Ratio of Silicon Contained in Heat-expandable Microspheres

An alkaline digestion solution was prepared by dissolving potassium hydroxide in a uniform 95:5 mixture of ethanol and water. Ten milliliters of the alkaline digestion solution was added to 1.0 g of heat-expandable microspheres and the mixture was heated with an electric heater at 380° C. for at least 30 min. Then the heated mixture was ignited to be carbonized, and then incinerated in an electric furnace. To the incinerated matter, 0.5 g of a reagent prepared by mixing an equal quantity of sodium carbonate and potassium carbonate was added. The mixture was then melted and cooled, and ultrapure water was added to make 50 mL. The amount of silicon in the sample was measured with an ICP optical emission spectrometer (ICP-8100, manufactured by Shimadzu Corporation). The result was calculated into the ratio of silicon contained in the heat-expandable microspheres.

Determination of Expansion-initiation Temperature (Ts) and Maximum Expansion Temperature $T_{max}$ of Heat-expandable Microspheres Those temperatures were determined with a DMA (DMA Q800, manufactured by TA Instruments). In an aluminum cup of 4.8 mm deep and 6.0 mm in diameter (5.65 mm in inside diameter), 0.5 mg of heat-expandable microspheres were placed, and the cup was covered with an aluminum cap 0.1 mm thick and 5.6 mm in diameter to prepare a sample. The sample was set on the device and subjected to the pressure of 0.01 N with the compression unit of the device, and the height of the sample was measured. The sample was then heated at temperatures elevating at a rate of 10° C./min in the temperature range from 20 to 300° C., being subjected to the pressure of 0.01 N with the compression unit, and the vertical change of the position of the compression unit was measured. The temperature at which the compression unit started to change its position to the positive direction was determined as the expansion-initiation temperature (Ts), and the temperature at which the compression unit indicated the highest position was determined as the maximum expansion temperature (Tmax).

True Specific Gravity of Hollow Particles

The true specific gravity of the hollow particles was determined by the liquid substitution method (Archimedean method) with isopropyl alcohol in an atmosphere at 25° C. and 50% RH (relative humidity) as described below.

At first, an empty 100-mL measuring flask was dried and weighed ($WB_1$). Then isopropyl alcohol was poured into the weighed measuring flask to form meniscus accurately, and the measuring flask filled with isopropyl alcohol was weighed ($WB_2$). The 100-mL measuring flask was then emptied, dried, and weighed ($WS_1$). About 50 mL of hollow particles were placed in the weighed measuring flask, and the measuring flask containing the hollow particles was weighed ($WS_2$). Then isopropyl alcohol was poured into the measuring flask containing the hollow particles to form meniscus accurately without taking bubbles into the isopropyl alcohol, and the flask filled with the hollow particles and isopropyl alcohol was weighed ($WS_3$). The values, $WB_1$, $WB_2$, $WS_1$, $WS_2$, and $WS_3$, were introduced into the following expression to calculate the true specific gravity (d) of the hollow particles.

$$d=[(WS_2-WS_1)\times(WB_2-WB_1)/100]/[(WB_2-WB_1)-(WS_3-WS_2)]$$

Determination of True Specific Gravity of Microspheres at Maximum Expansion

A 12 cm long, 13 cm wide, and 9 cm high box having a flat bottom was made of aluminum foil, and 1.0 g of heat-expandable microspheres was filled into uniform thickness. Then the heating of the microspheres was started at the expansion-initiation temperature obtained by the measuring method mentioned above. The heating temperature was repeatedly raised by 5° C. and maintained for 1 minute to heat the microspheres, and at each step of temperature raising the true specific gravity of the expanded microspheres (hollow particles) was determined in the same manner as in the determination method of true specific gravity mentioned above. The lowest true specific gravity among the results was determined as the true specific gravity of the microspheres at their maximum expansion.

Agglomeration of Microspheres in Thermal Expansion

During the determination of the true specific gravity of heat-expandable microspheres mentioned above, the microspheres were visually inspected to find any agglomeration.

Example 1

An aqueous dispersion medium was prepared by adding 200 g of colloidal silica dispersion A (containing 20 wt % of colloidal silica having the mean particle size of 5 nm and specific surface area of 550 m$^2$/g) and 3.0 g of adipic acid-diethanol amine condensate solution (containing 50 wt % of the compound) to 600 g of deionized water and controlling the pH of the mixture at 3.0. The aqueous dispersion medium had the viscosity of 4.4 mPa·s at 20° C.

An oily mixture was prepared by mixing a monomer component (consisting of 180 g of acrylonitrile, 105 g of methacrylonitrile and 15 g of methyl methacrylate), crosslinking agent (1.5 g of trimethylolpropane trimethacrylate), blowing agent (30 g of isobutane and 30 g of isopentane) and polymerization initiator (2.0 g of 2,2'-azobis (2.4-dimethylvaleronitrile)).

The aqueous dispersion medium and the oily mixture were mixed and the mixture was agitated with a Homomixer at 12000 rpm for 5 min to be prepared into a suspension. Then the suspension was transferred into a compressive reactor of 1.5-liter capacity, purged with nitrogen, and polymerized at 60° C. for 15 hours by agitating the suspension at 80 rpm under the initial reaction pressure at 0.2 MPa. The resultant polymerization product was filtered and dried to be made into heat-expandable microspheres. The properties of the resultant microspheres were tested and the result is shown in Table 1.

Examples 2 to 11 and Comparative Examples 1 to 7

Heat-expandable microspheres were produced in the same manner as that of Example 1 except that the components of the aqueous dispersion medium and oily mixture were replaced with those shown in Table 1. The viscosity of the aqueous dispersion medium and the properties of the resultant heat-expandable microspheres of each of the Examples and Comparative examples are shown in Tables 1 and 2.

The abbreviations in Tables 1 and 2 are explained in Table 3.

TABLE 1

| | | Examples | | | | | | | | |
|---|---|---|---|---|---|---|---|---|---|---|
| | | 1 | 2 | 3 | 4 | 5 | 6 | 7 | 8 | 9 |
| Aqueous dispersion medium | Deionized water (g) | 600 | 680 | 740 | 700 | 600 | 690 | 600 | 790 | 740 |
| | NaCl (g) | — | — | — | — | 100 | — | 30 | — | — |
| | Colloidal silica dispersion A (g) | 200 | 120 | 60 | 100 | 30 | 110 | 95 | 10 | — |
| | Colloidal silica dispersion B (g) | — | — | — | — | — | — | — | — | — |
| | Colloidal silica dispersion C (g) | — | — | — | — | — | — | — | — | — |
| | Colloidal silica dispersion D (g) | — | — | — | — | — | — | — | — | — |
| | Colloidal silica dispersion E (g) | — | — | — | — | — | — | — | — | 40 |
| | Colloidal silica dispersion F (g) | — | — | — | — | — | — | — | — | — |
| | Colloidal silica dispersion G (g) | — | — | — | — | — | — | — | — | — |
| | ADA-DEA (g) | 6.0 | 6.0 | — | 3.0 | — | — | — | — | 8.0 |
| | PVP (g) | — | — | 1.0 | — | 1.0 | 1.0 | 1.0 | 0.5 | — |
| | CMPEI (g) | — | — | 0.10 | — | — | — | 0.10 | — | 0.10 |
| | EDTA (g) | — | — | — | — | 0.10 | — | — | — | — |
| | $AlCl_3 \cdot 6H_2O$ (g) | — | — | — | 0.15 | — | 0.15 | — | 0.15 | — |
| | Potassium dichromate (g) | — | — | — | — | — | — | — | — | — |
| | pH | 3.0 | 2.0 | 3.0 | 3.0 | 3.0 | 3.0 | 3.0 | 3.0 | 2.0 |
| | Viscosity (mPa · s @ 20° C.) | 4.4 | 3.8 | 7.2 | 1.8 | 24.8 | 21.3 | 58.0 | 5.8 | 7.1 |
| Monomer component | AN (g) | 180 | 180 | 135 | 150 | 75 | 120 | 130 | 150 | 135 |
| | MAN (g) | 105 | 105 | — | 130 | 75 | — | 130 | 130 | — |
| | MA (g) | — | — | — | — | — | 60 | — | — | — |
| | MMA (g) | 15 | 15 | 30 | — | — | 120 | — | — | 30 |
| | IBX (g) | — | — | — | 20 | — | — | 20 | 20 | — |
| | $VCl_2$ (g) | — | — | 135 | — | — | — | — | — | 135 |
| | PMI (g) | — | — | — | — | — | — | 20 | — | — |
| | MAA (g) | — | — | — | — | 150 | — | — | — | — |
| Cross-linking agent | Cross-linking agent A (g) | 1.5 | 1.5 | 0.5 | — | — | 1.0 | 1.0 | — | 0.5 |
| | Cross-linking agent B (g) | — | — | 0.5 | 1.0 | 1.0 | — | — | 1.0 | 0.5 |
| Blowing agent | Isobutane (g) | 30 | 30 | 70 | — | — | 20 | — | — | 70 |
| | Neopentane (g) | — | — | — | — | — | — | — | — | — |
| | Isopentane (g) | 30 | 30 | — | 50 | 25 | 40 | 20 | 50 | — |
| | Isooctane (g) | — | — | — | — | 25 | — | 15 | — | — |
| Polymerization initiator | Initiator A (g) | 2.0 | 2.0 | — | 2.0 | — | — | 2.0 | 2.0 | — |
| | Initiator B (g) | — | — | 3.0 | — | 3.0 | 3.0 | — | — | 3.0 |
| Polymerization state | Production stability | good | good | good | good | good | good | good | good | good |
| | Heat generation in polymerization reaction | good | good | good | good | good | good | good | good | good |
| Heat-expandable microspheres | Mean particle size (μm) | 0.9 | 1.5 | 4.5 | 2.0 | 6.0 | 3.5 | 8.5 | 7.5 | 3.9 |
| | Expansion-initiation temp. Ts(° C.) | 105 | 103 | 85 | 118 | 165 | 95 | 130 | 115 | 85 |
| | Maximum expansion temp. Tmax (° C.) | 125 | 128 | 115 | 145 | 208 | 118 | 175 | 155 | 108 |
| | True specific gravity at maximum expansion | 0.31 | 0.19 | 0.05 | 0.09 | 0.05 | 0.08 | 0.02 | 0.02 | 0.07 |
| | Agglomeration of microspheres in thermal expansion | none | none | none | none | none | none | none | none | none |
| | Silicon (wt %) | 2.9 | 1.8 | 1.0 | 1.6 | 0.5 | 1.8 | 1.6 | 0.2 | 0.7 |
| | Ash (wt %) | 9.5 | 6.0 | 3.0 | 4.5 | 9.0 | 6.0 | 7.2 | 0.5 | 2.1 |

TABLE 2

| | | Examples | | Comparative examples | | | | | | |
|---|---|---|---|---|---|---|---|---|---|---|
| | | 10 | 11 | 1 | 2 | 3 | 4 | 5 | 6 | 7 |
| Aqueous dispersion medium | Deionized water (g) | 690 | 650 | 400 | 400 | 600 | 680 | 500 | 798 | 740 |
| | NaCl (g) | — | — | — | — | — | — | 180 | — | — |
| | Colloidal silica dispersion A (g) | — | — | — | 400 | — | — | — | 2 | 60 |
| | Colloidal silica dispersion B (g) | — | — | 400 | — | — | — | — | — | — |
| | Colloidal silica dispersion C (g) | — | — | — | — | — | 120 | 110 | — | — |
| | Colloidal silica dispersion D (g) | — | — | — | — | 200 | — | — | — | — |
| | Colloidal silica dispersion E (g) | — | — | — | — | — | — | — | — | — |
| | Colloidal silica dispersion F (g) | 80 | — | — | — | — | — | — | — | — |
| | Colloidal silica dispersion G (g) | — | 200 | — | — | — | — | — | — | — |

TABLE 2-continued

|  |  | Examples | | Comparative examples | | | | | | |
|---|---|---|---|---|---|---|---|---|---|---|
|  |  | 10 | 11 | 1 | 2 | 3 | 4 | 5 | 6 | 7 |
|  | ADA-DEA (g) | — | 6 | 6.0 | 6.0 | 6.0 | 6.0 | — | — | — |
|  | PVP (g) | 1.0 | — | — | — | — | — | 1.6 | 0.3 | 0.5 |
|  | CMPEI (g) | — | — | — | — | — | — | — | — | 0.10 |
|  | EDTA (g) | — | — | — | — | — | — | — | — | — |
|  | $AlCl_3 \cdot 6H_2O$ (g) | 0.15 | — | — | — | — | — | — | 0.15 | — |
|  | Potassium dichromate (g) | — | — | — | — | — | 0.15 | — | — | — |
|  | pH | 3.0 | 3.0 | 3.0 | 3.0 | 3.0 | 4.0 | 3.0 | 3.0 | 7.5 |
|  | Viscosity (mPa · s @ 20° C.) | 19.8 | 3.5 | 8.3 | 12.2 | 1.6 | 6.5 | 22.5 | 1.2 | 2.0 |
| Monomer component | AN (g) | 120 | 180 | 180 | 180 | 180 | 323 | 58 | 150 | 135 |
|  | MAN (g) | — | 105 | 105 | 105 | 105 | — | 100 | 130 | — |
|  | MA (g) | 60 | — | — | — | — | — | — | — | — |
|  | MMA (g) | 120 | 15 | 15 | 15 | 15 | — | — | — | 30 |
|  | IBX (g) | — | — | — | — | — | — | — | 20 | — |
|  | $VCl_2$ (g) | — | — | — | — | — | 139 | — | — | 135 |
|  | PMI (g) | — | — | — | — | — | — | — | — | — |
|  | MAA (g) | — | — | — | — | — | — | 40 | — | — |
| Cross-linking agent | Cross-linking agent A (g) | 1.0 | 1.5 | — | — | 1.5 | — | 1.0 | — | 0.5 |
|  | Cross-linking agent B (g) | — | — | — | — | — | — | — | 1.0 | 0.5 |
| Blowing agent | Isobutane (g) | 20 | 30 | — | — | 30 | — | — | — | 70 |
|  | Neopentane (g) | — | — | — | — | — | 139 | — | — | — |
|  | Isopentane (g) | 40 | 30 | 50 | 50 | 30 | — | 40 | 50 | — |
|  | Isooctane (g) | — | — | — | — | — | — | 20 | — | — |
| Polymerization initiator | Initiator A (g) | — | 2.0 | 2.0 | 2.0 | 2.0 | 2.0 | 2.0 | 2.0 | — |
|  | Initiator B (g) | 3.0 | — | — | — | — | — | — | — | 3.0 |
| Polymerization state | Production stability | good | good | good | poor | poor | poor | good | poor | poor |
|  | Heat generation in polymerization reaction | good | good | poor | poor | poor | poor | poor | poor | poor |
| Heat-expandable microspheres | Mean particle size (μm) | 2.8 | 5.2 | 1.9 | Agglomerated and solidified | Agglomerated and solidified | 11.0 | 63.0 | Agglomerated and solidified | Agglomerated and solidified |
|  | Expansion-initiation temp. Ts (° C.) | 95 | 105 | 105 | | | 85 | 145 | | |
|  | Maximum expansion temp. Tmax (° C.) | 114 | 131 | 127 | | | 110 | 190 | | |
|  | True specific gravity at maximum expansion | 0.09 | 0.05 | 0.18 | | | 0.02 | 0.02 | | |
|  | Agglomeration of microspheres in thermal expansion | none | none | none | | | fused | none | | |
|  | Silicon (wt %) | 1.3 | 2.3 | 5.8 | | | 1.3 | 3.8 | | |
|  | Ash (wt %) | 3.8 | 9.3 | 15.0 | | | 4.5 | 12.0 | | |

TABLE 3

| Abbreviation | Detail |
|---|---|
| NaCl | Sodium chloride |
| Colloidal silica dispersion A | Containing 20-wt % of colloidal silica with the mean particle size of 5 nm and specific surface are of 550 $m^2/g$ |
| Colloidal silica dispersion B | Containing 20-wt % of colloidal silica with the mean particle size of 11 nm and specific surface are of 260 $m^2/g$ |
| Colloidal silica dispersion C | Containing 30-wt % of colloidal silica with the mean particle size of 12 nm and specific surface are of 238 $m^2/g$ |
| Colloidal silica dispersion D | Containing 20-wt % of colloidal silica with the mean particle size of 0.8 nm and specific surface are of 3400 $m^2/g$ |
| Colloidal silica dispersion E | Containing 15-wt % of colloidal silica with the mean particle size of 1.3 nm and specific surface are of 2090 $m^2/g$ |
| Colloidal silica dispersion F | Containing 18-wt % of colloidal silica with the mean particle size of 2.9 nm and specific surface are of 938 $m^2/g$ |
| Colloidal silica dispersion G | Containing 20-wt % of colloidal silica with the mean particle size of 8.5 nm and specific surface are of 320 $m^2/g$ |
| PVP | Polyvinyl pyrrolidone |
| ADA-DEA | Adipic acid-diethanolamine condensate (effective concentration 50 wt %) |
| CMPEI | Polyethyleneimines (having —$CH_2COONa$ as the substituent with 80% substitution ratio, having a weight-average molecular weight of 50,000), also referred to as carboxymethylated polyethyleneimine sodium salt |
| EDTA | Ethylenediaminetetraacetic acid tetrasodium salt |
| $AlCl_3 \cdot 6H_2O$ | Aluminum chloride hexahydrate |
| AN | Acrylonitrile |
| MAN | Methacrylonitrile |
| MA | Methyl acrylate |

TABLE 3-continued

| Abbreviation | Detail |
| --- | --- |
| MMA | Methyl methacrylate |
| IBX | Isobornyl methacrylate |
| $VCl_2$ | Vynilidene chloride |
| PMI | N-Phenylmaleimide |
| MAA | Methacrylic acid |
| Cross-linking agent A | Trimethylolpropane trimethacrylate |
| Cross-linking agent B | Ethyleneglycol dimethacrylate |
| Isobutane | 2-Methyl propane |
| Neopentane | 2,2-Dimethylpropane |
| Isopentane | 2-Methylbutane |
| Isooctane | 2,2,4-Trimethylpentane |
| Initiator A | 2,2'-Azobis(2,4-dimethyl)valeronitrile |
| Initiator B | Di-2-ethylhexylperoxydicarbonate (70%) |

The colloidal silica used in the processes of Examples 1 to 11, which have mean particle size from 1.3 to 8.5 nm, are estimated to have contributed to the low viscosity of the polymerization liquids during polymerization step. The low viscosity enabled efficient removal of the heat generated in the polymerization and control of the viscosity increase of the polymerization liquid due to agglomeration of the components and reaction products. Thus the advantage and stability of the processes were clearly demonstrated. The amount of particulate silica coating the surface of the heat-expandable microspheres of small particle size is estimated to be the minimum required to produce the microspheres, and it contributes to good dispersibility of the microspheres and controlling the viscosity increase of paints or similar materials blended with the microspheres.

The aqueous dispersion medium in Comparative example 1 contained a high amount of colloidal silica in order to produce heat-expandable microspheres of small particle size. Thus the polymerization liquid had high viscosity and the heat generated in the polymerization could not be removed efficiently. The resultant heat-expandable microspheres contained a high amount of ash and did not fuse when thermally expanded owing to the high amount of silica coating their surface. Such microspheres, however, cannot be dispersed well in paints to adversely affect the smoothness of the paint film surface.

In Comparative example 2, the amount of colloidal silica, which had a mean particle size of 5 nm, in the aqueous dispersion medium was excessive for the total amount of the polymerizable monomers and blowing agent. The excessive colloidal silica made unstable globules of the oily mixture in the aqueous dispersion medium to cause the agglomeration and solidification of the components during polymerization and failure in production of the heat-expandable microspheres.

In Comparative example 3, the colloidal silica, which had a mean particle size of 0.8 nm, in the aqueous dispersion medium could not stabilize the globules of the oily mixture dispersed in the aqueous dispersion medium. The unstable globules resulted in the agglomeration and solidification of the components during polymerization and failure in production of the heat-expandable microspheres.

In Comparative example 4, the components agglomerated during polymerization and impaired the stability of the production. The surface of the resultant heat-expandable microspheres was coated with silica of comparatively large particle size which could not sufficiently control fusing of the heat-expandable microspheres during thermal expansion.

In Comparative example 5, the aqueous dispersion medium contained a large amount of colloidal silica having large mean particle size. Thus the resultant heat-expandable microspheres contained a considerable amount of ash which can inhibit dispersion of the microspheres in paints to adversely affect the smoothness of the paint film surface.

In Comparative example 6, the aqueous dispersion medium contained only a small amount of colloidal silica, and caused agglomeration and solidification of the components during polymerization and failure in the production of heat-expandable microspheres.

In Comparative example 7, the aqueous dispersion medium had a pH higher than 7 which made unstable globules of the oily mixture in the aqueous dispersion medium to cause agglomeration and solidification of the components during polymerization and failure in the production of heat-expandable microspheres.

The heat-expandable microspheres could be processed into hollow particles as in Example A1 and Comparative example A1 mentioned below, according to the wet thermal expansion method described in Japanese Patent Application Publication 1987-201231.

Example A1

Preparation of Hollow Particles by Wet Thermal Expansion

An aqueous dispersion (slurry) containing 5 wt % of the heat-expandable microspheres produced in Example 2 was prepared. The microspheres in the slurry were expanded in the wet thermal expansion method described in Japanese Patent Application Publication 1987-201231, where the slurry was fed through a slurry introducing pipe to an expansion tube (specified as SUS304TP in JIS, 16 mm in diameter, 120-ml capacity) at a flow rate of 5 L/min. Steam (at 147° C., of a pressure of 0.3 MPa) was fed to the tube through a steam introducing pipe to be mixed with the slurry so as to thermally expand the microspheres under wet condition. The temperature of the mixture of the slurry and steam was controlled at 115° C.

The slurry containing the hollow particles was flowed out through the tip of the expansion tube and mixed with cooling water (at 15° C.) to be cooled down to 50 to 60° C. The cooled slurry was dehydrated with a centrifugal dehydrator to obtain a composition containing 10 wt % of hollow particles (and 90 wt % of water).

The resultant hollow particles were isolated. The hollow particles had a mean particle size of 2.7 μm and a true specific gravity of 0.20, and contained 5.5 wt % of ash.

Fifty grams of the resultant hollow particles was added to 950 g of a water-based acrylic coating (Water-based coating for versatile use, manufactured by Asahipen Corporation), mixed in a mixer with a dispersion blade, and defoamed with a planetary mixer (ARE-500, manufactured by Thinky) to be prepared into a paint composition. The paint composition was screened through a 200-mesh polyester mesh fabric, and no residue was left on the mesh fabric to prove good dispersibility of the hollow particles.

The paint composition was applied to a steel plate to make 0.6-mm thick dry film. The film was smooth enough and imparted thermal insulation property to the plate.

Comparative Example A1

Wet hollow particles and a paint composition were prepared in the same manner as that in Example A1 except that the heat-expandable microspheres of Example 2 were replaced by the heat-expandable microspheres of Comparative example 1.

The resultant hollow particles had a mean particle size of 3.1 μm and a true specific gravity of 0.20, and contained 13.6 wt % of ash. The resultant paint composition was screened through a 200-mesh polyester mesh fabric in the same manner as that in Example A1, and agglomerated materials about 1 mm particle size were left on the mesh fabric to prove poor dispersibility of the hollow particles due to high ash content.

Twenty parts by weight of the heat-expandable microspheres of Example 4 (with a thermoplastic resin shell having a softening point of 109° C.) and 80 parts by weight of titanium oxide (TIPAQUE CR-50, with a mean particle size about 0.25 μm, manufactured by Ishihara Sangyo Kaisha, Ltd.) were mixed in a separable flask. Then the mixture was heated to 140° C. with agitation to obtain fine-particle-coated hollow particles.

The resultant fine-particle-coated hollow particles had a mean particle size of 4.1 μm and a true specific gravity of 0.53. The content in the measuring flask after measuring the true specific gravity of the fine-particle-coated hollow particles was stood still for 30 minutes, and the separated liquid phase was clear to show that the titanium oxide firmly coated the hollow particles and none of them left the surface of the hollow particles.

Comparative Example A2

Fine-particle-coated hollow particles were produced in the same manner as that in Example A2 except that the heat-expandable microspheres were replaced by the heat-expandable microspheres of Comparative example 1.

The resultant fine-particle-coated hollow particles had a mean particle size of 3.1 μm and a true specific gravity of 0.83. The content in the measuring flask after measuring the true specific gravity of the fine-particle-coated hollow particles was stood still for 30 minutes. The separated liquid phase was turbid to imply that the titanium oxide did not firmly coat the hollow particles. The turbid liquid phase was caused by high amount of ash and silicon contained in the heat-expandable microspheres used to produce the hollow particles, in other words, the surface of the heat-expandable microspheres was covered with silica which prohibited the adhesion of titanium oxide to the surface of the hollow particles or released the titanium oxide. Such fine-particle-coated hollow particles causing high amount of released titanium oxide increased the viscosity of paints and sealants.

A slurry composition for the negative electrode of a lithium-ion secondary battery was prepared with the hollow particles produced in the aforementioned processes to test the lifespan of the resultant lithium-ion secondary battery.

Example of Production B1

A slurry composition for the negative electrode was prepared by mixing 100 parts by weight of graphite (MCMB2528, produced by Osaka Gas Co., Ltd.) as the negative electrode active material, 1.0 parts by weight of carboxymethyl cellulose (CELLOGEN 7A, produced by DKS Co., Ltd.) as a viscosity improver, 2.5 parts by weight of a SBR binder (BM-400B, 40 wt % concentration, produced by Zeon Corporation) and 50 parts by weight of deionized water. The slurry composition was applied to the surface of a 20-μm thick copper foil with a Comma coater to make a 150-μm thick film. The slurry was then vacuum-dried at 120° C. for 1 hour, pressed with a pressure ranging from $1 \times 10^2$ to $3 \times 10^2$ N/mm², and dried in a vacuum oven at 120° C. for 12 hours to be processed into a 80-μm thick negative electrode sheet.

A slurry composition for the positive electrode was prepared by mixing 100 parts by weight of $LiCoO_2$ having a volumetric mean particle size of 12 μm as the positive electrode active material, 2 parts by weight of acetylene black (HS-100, produced by Denka Company Limited) as a conductive auxiliary, 25 parts by weight of a polyvinylidene difluoride binder (#7208, 8-wt % N-methylpyrrolidone solution, produced by Kureha Corporation) and N-methylpyrrolidone to make a solid concentration of 70 wt %. The slurry composition for the positive electrode was applied to the surface of a 20-μm thick aluminum foil to make a 150-μm thick dry film. The slurry was then dried at 60° C. for 2 min and heated at 120° C. for 2 min to be processed into a positive electrode sheet.

An aluminum casing was prepared for the battery casing. The positive electrode mentioned above was cut into a 4-cm square and placed on the casing to make the surface without the slurry film contact to the casing.

Then a separator (Celgard 2500, manufactured by Celgard LLC.) was cut into a 5-cm square and placed on the surface of the positive electrode active material layer of the positive electrode. Then the negative electrode sheet mentioned above was cut into a 4.2-cm square and placed on the separator to make the negative electrode active material contact to the separator. A liquid electrolyte (consisting of 68.5:30:1.5 mixture of ethylene carbonate, diethyl carbonate and vinylene carbonate in volumetric ratio and 1 M of $LiPF_6$) was poured in the aluminum casing without introducing air bubbles. Then the aluminum casing was closed by heat-sealing at 150° C. to make a laminated lithium-ion secondary battery (laminated cell).

Capacity Retention of the Battery

The laminated lithium-ion secondary battery was stood still at 25° C. for 24 hours, then charged to 4.2 V at 1 C and discharged to 3.0 V at 1 C at 25° C. to measure the initial capacity, $C_0$. Then the battery was charged to 4.2 V at 1 C and discharged to 3.0 V at 1 C at 60° C. repeatedly, and the capacity after 1,000 cycles of charge/discharge, $C_2$, was measured. The capacity retention of the battery, $\Delta C$, was calculated by the following expression.

$$\Delta C(\%) = C_2/C_0 \times 100$$

Example C1

A composition containing 10 wt % of hollow particles (and 90 wt % of water) was prepared in the same manner as the wet thermal expansion method of Example A1 except that the heat-expandable microspheres of Example 2 were replaced by the heat-expandable microspheres of Example 6.

The resultant hollow particles were isolated. The hollow particles had a mean particle size of 7.0 μm and a true specific gravity of 0.09, and contained 4.8 wt % of ash and 1.4 wt % of silicon.

Then a hollow particles-containing slurry composition for the negative electrode was prepared by adding 10 parts by weight of the composition containing 10 wt % of hollow particles mentioned above to the slurry composition for the negative electrode of Example of production B1.

A lithium-ion secondary battery was made in the same manner as that in Example of production B1 except that the slurry composition for the negative electrode of Example of production B1 was replaced by the hollow particles-containing slurry composition for the negative electrode.

The capacity retention of the resultant lithium-ion secondary battery calculated was in the ratio of 118 to 100 of the capacity retention of the lithium-ion secondary battery of Example of Production B1 which was made without the hollow particles. The result proves the improvement in the capacity retention.

Comparative Example C1

A composition containing 10 wt % of hollow particles (and 90 wt % of water) was prepared in the same manner as the wet thermal expansion method of Example C1 except that the heat-expandable microspheres of Example 6 were replaced by the heat-expandable microspheres of Comparative example 1.

The resultant hollow particles were isolated. The hollow particles had a mean particle size of 4.5 μm and a true specific gravity of 0.2, and contained 14 wt % of ash and 5.5 wt % of silicon.

Then a lithium-ion secondary battery was made in the same manner as that in Example C1, and the negative electrode of the battery swelled.

Comparative Example C2

A composition containing 10 wt % of hollow particles (and 90 wt % of water) was prepared in the same manner as the wet thermal expansion method of Example C1 except that the heat-expandable microspheres of Example 6 were replaced by the heat-expandable microspheres of Comparative example 4 and the slurry temperature for the wet thermal expansion (expansion temperature) was set at 110° C.

The resultant hollow particles were isolated. The hollow particles had a mean particle size of 49 μm and a true specific gravity of 0.02, and contained 4.0 wt % of ash and 1.2 wt % of silicon. In addition, the hollow particles contained agglomerated materials.

Then a lithium-ion secondary battery was made in the same manner as that in Example C1. The capacity retention of the resultant lithium-ion secondary battery calculated was in the ratio of 78 to 100 of the capacity retention of the lithium-ion secondary battery of Example of Production B1 which was made without the hollow particles. The result proves the decrease in the capacity retention.

The improved capacity retention of the battery of Example C1 can be attributed to the hollow particles having small particle size and containing small amount of silicon, which contributed to the decrease of the binder between the particles of the active material.

The negative electrode of the battery of Comparative example C1 can have been swelled by the liquid electrolyte in the battery due to the hollow particles containing high amount of silicon.

The decreased capacity retention of the battery of Comparative example C2 can have been caused by the agglomerated materials in the hollow particles though the hollow particles contained only a small amount of silicon.

INDUSTRIAL APPLICABILITY

The process of the present invention produces heat-expandable microspheres having a small particle size, containing minimum ash and which are thermally expanded into hollow particles having good dispersibility.

The heat-expandable microspheres of the present invention can be used as a lightweight additive for putties, paints, inks, sealants, mortar, paper clay, ceramic, etc., and also as an additive to matrix resins processed in injection molding, extrusion molding and pressure molding to be made into foamed products having excellent sound insulation, thermal insulation, heat-shielding, and sound absorbency.

The invention has been described in detail with reference to the above embodiments. However, the invention should not be construed as being limited thereto. It should further be apparent to those skilled in the art that various changes in form and detail of the invention as shown and described above may be made. It is intended that such changes be included within the spirit and scope of the claims appended hereto.

The invention claimed is:

1. A process for producing heat-expandable microspheres comprising a thermoplastic resin shell and a blowing agent encapsulated therein, said process comprising the steps of:
   dispersing a polymerizable component and the blowing agent in an aqueous dispersion medium having a pH of 7 or less and containing a fine-particle metal compound having a mean particle size ranging from 1.0 to 10 nm; and
   polymerizing the polymerizable component;
   wherein an amount of the fine-particle metal compound ranges from 0.15 to 20 parts by weight to 100 parts by weight of the total amount of the polymerizable component and the blowing agent,
   a mean particle size of the heat-expandable microspheres ranges from 0.01 to 9.0 μm,
   the heat-expandable microspheres contain 10 wt % or less of ash,
   a specific surface area of the fine-particle metal compound ranges from 270 to 2720 $m^2/g$, and
   an amount of an electrolyte is less than 5 wt % of the aqueous dispersion medium.

2. The process for producing heat-expandable microspheres as claimed in claim 1, wherein the fine-particle metal compound comprises colloidal silica.

3. The process for producing heat-expandable microspheres as claimed in claim 2, wherein the heat-expandable microspheres contain 5 wt % or less of silicon.

4. The process for producing heat-expandable microspheres as claimed in claim 1, wherein the aqueous dispersion medium has a pH ranging from 1.5 to 5.

* * * * *